United States Patent
Bishop et al.

(10) Patent No.: US 6,261,077 B1
(45) Date of Patent: Jul. 17, 2001

(54) RAPID PROTOTYPING APPARATUS WITH ENHANCED THERMAL AND/OR VIBRATIONAL STABILITY FOR PRODUCTION OF THREE DIMENSIONAL OBJECTS

(75) Inventors: Raymond J. Bishop, Santa Clarita; Michael A. Everett, Saugus; Arvind Chari, West Hills; Timothy A. Ferris, Mission Viejo, all of CA (US)

(73) Assignee: 3D Systems, Inc., Valencia, CA (US)

( * ) Notice: Subject to any disclaimer, the term of this patent is extended or adjusted under 35 U.S.C. 154(b) by 0 days.

(21) Appl. No.: 09/246,416

(22) Filed: Feb. 8, 1999

(51) Int. Cl.7 .............................. B29C 35/08; B29C 41/08
(52) U.S. Cl. ........................ 425/174.4; 425/375; 264/401
(58) Field of Search .......................... 425/73, 375, 174.4; 264/308, 401

(56) References Cited

U.S. PATENT DOCUMENTS

| | | | |
|---|---|---|---|
| 4,154,561 | * 5/1979 | Virtanen | 425/73 |
| 4,575,330 | 3/1986 | Hull | 425/174.4 |
| 4,752,352 | 6/1988 | Feygin | 156/630 |
| 4,863,538 | 9/1989 | Deckard | 156/62.2 |
| 4,999,143 | 3/1991 | Hull et al. | 425/174.4 |
| 5,015,312 | 5/1991 | Kinzie | 156/63 |
| 5,058,988 | 10/1991 | Spence | 264/401 |
| 5,059,021 | 10/1991 | Spence | 264/22 |
| 5,071,337 | * 12/1991 | Heller et al. | 425/174.4 |

(List continued on next page.)

FOREIGN PATENT DOCUMENTS

| | | |
|---|---|---|
| 95/18009 | 7/1995 | (WO). |
| 95/29053 | 11/1995 | (WO). |
| 96/12607 | 5/1996 | (WO). |
| 96/12608 | 5/1996 | (WO). |
| 96/12609 | 5/1996 | (WO). |
| 96/12610 | 5/1996 | (WO). |
| 97/11835 | 4/1997 | (WO). |
| 97/11837 | 4/1997 | (WO). |
| 98/51479 | 11/1998 | (WO). |

OTHER PUBLICATIONS

U.S. application No. 09/154,967, Nguyen et al., filed Sep. 17, 1998, now abandoned.
U.S. application No. 09/247,113, Chari et al., filed Feb. 8, 1998,
U.S. application No. 09/247,120, Everett et al., filed Feb. 8, 1999.
Jacobs, Paul F., Stereolithography and Other RP&M Technologies From Rapid Prototyping to Rapid Tooling, Society of Manufacturing Engineers, 1996.
Jacobs, Paul F., Rapid Prototyping & Manufacturing Fundamentals of Stereolithography, Society of Manufacturing Engineers, 1992.

Primary Examiner—Harold Pyon
Assistant Examiner—Thu Khanh T. Nguyen
(74) Attorney, Agent, or Firm—Laura Bishop; Ralph D'Alessandro

(57) ABSTRACT

A rapid prototyping and manufacturing (e.g. stereolithography) apparatus includes a secondary frame located within a primary frame of the system. The secondary frame defines an enclosure for housing a number of peripheral heat-producing components and peripheral vibration-producing components. The heat generated by these peripheral heat-producing components is substantially isolated in the enclosure and is removed from the primary frame so as not to cause an undesired impact on other components within the main frame. The secondary frame preferably sits directly on the floor or other surface without touching the primary frame, thus substantially avoiding transmittance of vibration from components in the enclosure to the primary frame of the system.

26 Claims, 17 Drawing Sheets

U.S. PATENT DOCUMENTS

| | | | |
|---|---|---|---|
| 5,076,974 | 12/1991 | Modrek et al. | 264/340 |
| 5,104,592 | 4/1992 | Hull et al. | 425/174.4 |
| 5,121,329 | 6/1992 | Crump | 425/174.4 |
| 5,123,734 | 6/1992 | Spence et al. | 425/174.4 |
| 5,133,987 | 7/1992 | Spence et al. | 425/174.4 |
| 5,174,931 | 12/1992 | Almguist et al. | 264/401 |
| 5,182,056 | 1/1993 | Spence et al. | 264/22 |
| 5,182,715 | 1/1993 | Vorgitch et al. | 425/174.4 |
| 5,184,307 | 2/1993 | Hull et al. | 264/308 |
| 5,204,055 | 4/1993 | Sachs et al. | 264/23 |
| 5,209,878 | 5/1993 | Smalley et al. | 264/401 |
| 5,234,636 | 8/1993 | Hull et al. | 264/22 |
| 5,238,639 | 8/1993 | Vinson et al. | 264/401 |
| 5,248,456 * | 9/1993 | Evans, Jr. et al. | 264/308 |
| 5,256,340 | 10/1993 | Allison et al. | 425/174.4 |
| 5,321,622 | 6/1994 | Snead et al. | 364/474.24 |
| 5,597,520 | 1/1997 | Smalley et al. | 425/174.4 |
| 5,645,862 * | 7/1997 | Sable et al. | 425/73 |
| 5,767,483 * | 6/1998 | Cameron et al. | 264/482 |
| 5,840,239 | 11/1998 | Partanen et al. | 264/401 |
| 5,902,537 | 5/1999 | Almquist et al. | 264/401 |
| 5,902,538 | 5/1999 | Kruger et al. | 264/401 |
| 6,001,297 | 12/1999 | Partanen et al. | 264/401 |
| 6,084,980 | 7/2000 | Nguyen et al. | 264/401 |

* cited by examiner

RAPID PROTOTYPING APPARATUS WITH ENHANCED THERMAL AND/OR VIBRATIONAL STABILITY FOR PRODUCTION OF THREE DIMENSIONAL OBJECTS

FIELD OF THE INVENTION

This invention relates to the formation of three-dimensional objects using a Rapid Prototyping and Manufacturing (RP&M) technique (e.g. stereolithography). The invention more particularly relates to the formation of the three-dimensional objects using an improved Rapid Prototyping and Manufacturing apparatus with enhanced thermal and/or vibrational stability.

BACKGROUND OF THE INVENTION

1. Related Art

Rapid Prototyping and Manufacturing (RP&M) is the name given to a field of technologies that can be used to form three-dimensional objects rapidly and automatically from three-dimensional computer data representing the objects. Rapid Prototyping and Manufacturing can be considered to include three classes of technologies: (1) stereolithography, (2) selective deposition modeling, and (3) laminated object manufacturing.

The stereolithography class of technologies creates three-dimensional objects by successively forming layers of a fluid-like medium adjacent to previously formed layers of medium and selectively solidifying these layers to form and adhere laminae (i.e. solidified layers). These laminae are solidified according to cross-sectional data representing successive slices of the three-dimensional object. Typically, adhesion between successive laminae occurs by chemical bond formation between the two laminae (e.g. inter-lamina cross-linking) during polymerization. In alternative embodiments, it is possible that adhesion could occur by application of a separate adhesive or by other mechanical bonding. In summary, adhesion may occur via an adhesive or cohesive phenomenon.

One specific stereolithography technology is known simply as stereolithography, and uses a liquid medium building material that is selectively solidified by exposing it to stimulation. The liquid medium is typically a photopolymerizable material (i.e. resin) and the stimulation is typically visible or ultraviolet electromagnetic radiation. The radiation is typically produced by a laser. Liquid-based stereolithography is disclosed in various patents, applications, and publications, of which a number are briefly described in the Related Patents, Applications and Publications section hereafter. Another stereolithography technology is known as selective laser sintering (SLS). Selective laser sintering is based on the selective solidification of layers of a powdered medium by exposing the layers to infrared electromagnetic radiation to sinter or fuse the particles. Selective laser sintering is described in U.S. Pat. No. 4,863,538 issued Sep. 5, 1989, to Deckard. A third technology is known as Three Dimensional Printing (3DP). Three-dimensional printing is based on the selective solidification of layers of a powdered medium which are solidified by the selective deposition of a binder thereon. Three-dimensional printing is described in U.S. Pat. No. 5,204,055 issued Apr. 20, 1993, to Sachs, et al.

The present invention is primarily directed to stereolithography using liquid-based building materials (i.e. medium). It is believed, however, that the techniques of the present invention may have application in the other stereolithography technologies for the purposes of enhancing thermal and/or vibrational stability.

Selective deposition modeling, SDM, involves the build-up of three-dimensional objects by selectively depositing solidifiable material on a lamina-by-lamina basis according to cross-sectional data representing slices of the three-dimensional object. One such technique is called fused deposition modeling, FDM, and involves the extrusion of streams of heated, flowable material which solidify as they are dispensed onto the previously formed laminae of the object. Fused deposition modeling is described in U.S. Pat. No. 5,121,329 issued Jun. 9, 1992, to Crump. Another technique is called Ballistic Particle Manufacturing, BPM, which uses a 5-axis, ink-jet dispenser to direct particles of a material onto previously solidified layers of the object. Ballistic particle manufacturing is described in PCT Publication Nos. WO 96/12607 published May 2, 1996, by Brown, et al.; WO 96/12608 published May 2, 1996, by Brown et al.; WO 96/12609 published May 2,1996, by Menhennett et al.; and WO 96/12610 published May 2, 1996, by Menhennett et al. A third technique called Multijet Modeling (MJM) involves the selective deposition of droplets of material from multiple ink jet orifices to speed the building process. Multijet modeling is described in PCT Publication Nos. WO 97/111835 published Apr. 3, 1997, by Earl et al.; and, WO 97/11837 published Apr. 3, 1997, by Leyden et al. (both assigned to 3D Systems, Inc., as is the instant application).

Though, as noted above, the techniques of the instant invention are directed primarily to liquid-based stereolithography object formation, it is believed that the techniques may have application in the selective deposition modeling technologies to enhance thermal and/or vibrational stability of the selective deposition modeling systems.

Laminated object manufacturing, LOM, techniques involve the formation of three-dimensional objects by the stacking, adhering, and selective cutting, in a selected order, of sheets of material, according to the cross-sectional data representing the three-dimensional object to be formed. Laminated object manufacturing is described in U.S. Pat. No. 4,752,352 issued Jun. 21, 1988, to Feygin; and U.S. Pat. No. 5,015,312 issued May 14, 1991, to Kinzie; and in PCT Publication WO 95/18009 published Jul. 6, 1995, by Morita et al.

It is believed that the techniques may have application in the laminated object manufacturing technologies to enhance thermal and/or vibrational stability of the laminated object manufacturing systems.

A need exists in the art for rapid prototyping systems with enhanced thermal and/or vibrational stability for the efficient production of accurate three-dimensional objects.

2. Other Related Patents, Applications and Publications

The patents, applications and publications mentioned above and hereafter are all incorporated by reference herein as if set forth in full. Table 1 provides a table of patents, applications and publications co-owned by the assignee of the instant application. A brief description of subject matter found in each patent, application and publication is included in the table to aid the reader in finding specific types of teachings. It is not intended that the incorporation of subject matter be limited to those topics specifically indicated, but instead the incorporation is to include all subject matter found in these publications, applications and patents. The teachings in these incorporated references can be combined with the teachings of the instant application in many ways. For example, the various apparatus configurations disclosed in these references may be used in conjunction with the novel features of the instant invention.

TABLE 1

Related Patents, Applications and Publications

| Patent/Application/Publication No. | Inventor | Subject |
| --- | --- | --- |
| U.S. Pat. No. 4,575,330 | Hull | Discloses fundamental elements of stereolithography. |
| U.S. Pat. No. 4,999,143 | Hull, et al. | Discloses various removable support applicable to stereolithography. |
| U.S. Pat. No. 5,058,988 | Spence | Discloses the application of beam profiling techniques useful in stereolithography for determining cure depth, scanning velocity, etc. |
| U.S. Pat. No. 5,059,021 | Spence, et al. | Discloses the utilization of drift correction techniques for eliminating errors in beam positioning resulting from instabilities in the beam scanning system. |
| U.S. Pat. No. 5,076,974 | Modrek, et al. | Discloses techniques for post processing objects formed by stereolithography. In particular exposure techniques are described that complete the solidification of the building material. Other post processing steps are also disclosed such as steps of filing in or sanding off surface discontinues. |
| U.S. Pat. No. 5,104,592 | Hull | Discloses various techniques for reducing distortion, and particularly curl type distortion, in objects being formed by stereolithography. |
| U.S. Pat. No. 5,123,734 | Spence, et al. | Discloses techniques for calibrating a scanning system. In particular, techniques for mapping from rotational mirror coordinates to planar target surface coordinates are disclosed. |
| U.S. Pat. No. 5,133,987 | Spence, et al. | Discloses the use of a stationary mirror located on an optical path between the scanning mirrors and the target surface to fold the optical path in a stereolithography system. |
| U.S. Pat. No. 5,174,931 | Almquist, et al. | Discloses various doctor blade configurations for use in forming layers of medium adjacent to previously solidified laminae. |
| U.S. Pat. No. 5,182,056 | Spence, et al. | Discloses the use of multiple wavelengths in the exposure of a stereolithographic medium. |
| U.S. Pat. No. 5,182,715 | Vorgitch, et al. | Discloses various elements of a large stereolithographic system. |
| U.S. Pat. No. 5,184,307 from application No. 07/331,644 | Hull, et al. | Discloses a program called Slice and various techniques for converting three-dimensional object data into data descriptive of cross-sections. Disclosed techniques include line width compensation techniques (erosion routines), and object sizing techniques. The application giving rise to this patent included a number of appendices that provide further details regarding stereolithography methods and systems. |
| U.S. Pat. No. 5,209,878 | Smalley, et al. | Discloses various techniques for reducing surface discontinuities between successive cross-sections resulting from a layer-by-layer building technique. Disclosed techniques include use of fill layers and meniscus smoothing. |
| U.S. Pat. No. 5,234,636 | Hull, et al. | Discloses techniques for reducing surface discontinuities by coating a formed object with a material, heating the material to cause it to become flowable, and allowing surface tension to smooth the coating over the object surface. |
| U.S. Pat. No. 5,238,639 | Vinson, et al. | Discloses a technique for minimizing curl distortion by balancing upward curl to downward curl. |
| U.S. Pat. No. 5,256,340 and WO 95/29053 | Allison, et al. | Discloses various build/exposure styles for forming objects including various techniques for reducing object distortion. Disclosed techniques include: (1) building hollow, partially hollow, and solid objects, (2) achieving more uniform cure depth, (3) exposing layers as a series of separated tiles or bullets, (4) using alternate sequencing exposure patterns from layer to layer, (5) using staggered or offset vectors from layer to layer, and (6) using one or more overlapping exposure patterns per layer. |
| U.S. Pat. No. 5,321,622 | Snead, et al. | Discloses a computer program known as CSlice which is used to convert three-dimensional object data into cross-sectional data. Disclosed techniques include the use of various Boolean operations in stereolithography. |
| U.S. Pat. No. 5,597,520 and WO 95/29053 | Smalley, et al. | Discloses various exposure techniques for enhancing object formation accuracy. Disclosed techniques address formation of high resolution objects from building materials that have a Minimum Solidification Depth greater than one layer thickness and/or a Minimum Recoating Depth greater than the desired object resolution. |
| WO 97/11835 | Thayer, et al. | Discloses build and support styles for use in a Multi-Jet Modeling selective deposition modeling system. |
| WO 97/11837 | Earl, et al. | Discloses data manipulation and system control techniques for use in a Multi-Jet Modeling selective deposition modeling system. |
| U.S. Pat. No. 5,902,537 | Almquist, et al. | Discloses various recoating techniques for use in stereolithography, including 1) an ink jet dispensing device, 2) a fling jet recoater, 3) a vacuum applicator, 4) a stream recoater, 5) a counter rotating roller recoater, and 6) a technique for deriving sweep extents. |
| U.S. Pat. No. 5,840,239 5,840,239 | Partanen, et al. | Discloses the application of solid-state lasers to stereolithography. |
| U.S. Pat. No. 6,001,257 | Partanen, et al. | Discloses the use of a pulsed radiation source for solidifying layers of building and in particular the ability to limit pulse firing locations to only selected target locations on a surface of the medium. |
| U.S. Pat. No. 6,084,980 | Nguyen, et al. | Discloses techniques for interpolating originally supplied cross- |

TABLE 1-continued

Related Patents, Applications and Publications

| Patent/Application/Publication No. | Inventor | Subject |
|---|---|---|
| | | sectional data perspective of a three-dimensional object to produce modified data descriptive of the three-dimensional object including data descriptive of intermediate regions between the originally supplied cross-sections of data. |
| WO 98/51479 | Manners, et al. | Discloses techniques for identifying features of partially formed objects. Identifiable features include trapped volumes, effective trapped volumes, and solid features of a specified size. The identified regions can be used in automatically specifying recoating parameters and or exposure parameters. |
| U.S. Pat. No. 5,902,538 | Kruger, et al. | Discloses simplifies techniques for forming high resolution objects from materials posessing a minimum recoating depth (MRD) that is larger than a layer thickness resolution desired in forming objects. Building techniques include enhanced exposure and recoating techniques, with layers defined as primary or secondary. Recoating techniques are described which can be used when the thickness between consecutive layers is less than a leading edge bulge phenomenon. |
| US 09/154,967 | Nguyen, et al. | Discloses techniques for stereolithographic recoating using a sweeping recoating device that pause and/or slows down over laminae that are being coated over. |
| US 09/247,113 | Chari, et al. | Discloses improved stereolithographic techniques for maintaining build chamber temperature at a desired level. The techniques include varying heat production based on ht e difference between a detected temperature and the desired temperature |
| US 09/247,113 | Everett, et al. | Discloses techniques forming objects using varying production of prescribed stimulation (e.g. UV radiation). Production is reducing or eliminated during non-exposure periods (e.g. recoating, z-wait, and pre-dip delay). Production is set to a desired level based on the type of exposure that is desired. |

The following two books are also incorporated by reference herein as if set forth in full: (1) *Rapid Prototyping and Manufacturing: Fundamentals of Stereolithography*, by Paul F. Jacobs; published by the Society of Manufacturing Engineers, Dearborn Mich.; 1992; and (2) *Stereolithography and other RP&M Technologies: from Rapid Prototyping to Rapid Tooling*; by Paul F. Jacobs; published by the Society of Manufacturing Engineers, Dearborn Mich.; 1996.

SUMMARY OF THE INVENTION

A first aspect of the invention is to provide a rapid prototyping apparatus including a) a process module that includes a first heat-producing component; b) electro-optical components, at least one of which is a peripheral heat-producing component, the electro-optical components including an exposure system and a computer programmed to control the electro-optical components to form a three dimensional object from a building material located in the process module; c) a structure enclosing the process module and the electro-optical components; and d) at least one volume within the structure for substantially thermally isolating at least one of the peripheral heat-producing components from at least one of the electro-optical components.

A second aspect of the invention is to provide a rapid prototyping apparatus including a) a process module that includes a first heat-producing component; b) electro-optical components, some of which may also be one or both of vibration-producing components and peripheral heat-producing components, including an exposure system and a computer for controlling the electro-optical components to form a three dimensional object from a building material located in the process module; c) a structure enclosing the process module and the electro-optical components; and d) at least one volume within the structure for substantially thermally isolating at least one of the peripheral heat-producing components and for substantially vibrationally isolating at least one of the vibration-producing components from at least one of the electro-optical components.

A third aspect of the invention is to provide a rapid prototyping apparatus including a) a process module that includes a first heat-producing component; b) electro-optical components, some of which may be peripheral heat-producing components, including an exposure system and a computer for controlling the electro-optical components to form a three dimensional object from a building material located in the process module; c) a structure enclosing the process module and the electro-optical components; and d) at least one volume within the structure for substantially directing a portion of generated heat from the peripheral heat-producing components upward via convection.

A fourth aspect of the invention is to provide a rapid prototyping apparatus including a) a process module that includes a first heat-producing component; b) electro-optical components including a laser head, an exposure system and a computer for controlling the electro-optical components to form a three dimensional object from a building material located in the process module, wherein some electro-optical components may also be one or both of vibration-producing components and peripheral heat-producing components; c) a structure enclosing the process module and the electro-optical components; and d) at least one volume within the structure for substantially isolating the components producing heat and/or vibration from the laser head. The volume within the structure includes one enclosure, the enclosure includes an open top for substantially drawing a portion of generated heat toward the open top via convection, and the enclosure and the structure are detached.

A fifth aspect of the invention is to provide a rapid prototyping apparatus including a) a process module that includes a first heat-producing component; b) electro-optical components, some of which may be peripheral heat-producing components, including an exposure system and a computer for controlling the electro-optical components to form a three dimensional object from a building material located in the process module; c) a structure enclosing the process module and the electro-optical components; and d) at least one volume within the structure for moving a portion of generated heat from a majority of the peripheral heat-producing components located in the volume.

A sixth aspect of the invention is to provide a rapid prototyping apparatus including a) a structure enclosing at least a process module and an electro-optical module; b) a container for holding a building material; c) an elevator that moves up and down within the container; d) a platform attached to the elevator upon which three dimensional objects are built from the building material; e) a heater fan/motor to maintain the process module at a predetermined temperature during object formation; f) the process module including at least the container, platform, and the heater fan/motor; g) a laser head including at least one frequency conversion crystal; h) an infrared laser diode module for generating pumping radiation for the laser head; i) a recirculating chiller for cooling at least the infrared laser diode module during object formation; j) a laser power supply for supplying power to at least the infrared laser diode module during object formation; k) scanning mirrors to direct the output of the laser head to the building material during object formation; I) a mirror driver electrical chassis for supplying control signals to the scanning mirrors; m) a chamber controller electrical chassis for controlling at least the laser power, the elevator and the heater; n) a machine power supply electrical chassis for supplying power to at least the heater and the mirror driver; and o) a computer programmed to form a three dimensional object from a building material located in the process module, based on data representative of the object, by controlling the operation of at least the chamber controller, the mirror driver, and the laser power supply. The electro-optical module includes at least the laser power supply, the recirculating chiller, the infrared laser diode module, the computer, the machine power supply electrical chassis, the mirror driver electrical chassis, the chamber controller electrical chassis, and the laser head including at least one frequency conversion crystal. A volume within the electro-optical module includes at least one enclosure that contains at least the laser power supply, the recirculating chiller, the infrared laser diode module, the computer, the machine power supply electrical chassis, the mirror driver electrical chassis, and the chamber controller electrical chassis. The laser head is outside the enclosure, and the enclosure and the structure are detached.

Additional aspects of the invention will be clear from the detailed description of the invention, below, in conjunction with the Figures associated therewith. Further aspects of the invention involve those referenced above as well as other aspects, to be practiced alone and in various combinations with one another.

DESCRIPTION OF PREFERRED EMBODIMENT OF THE INVENTION

Figure 1A:
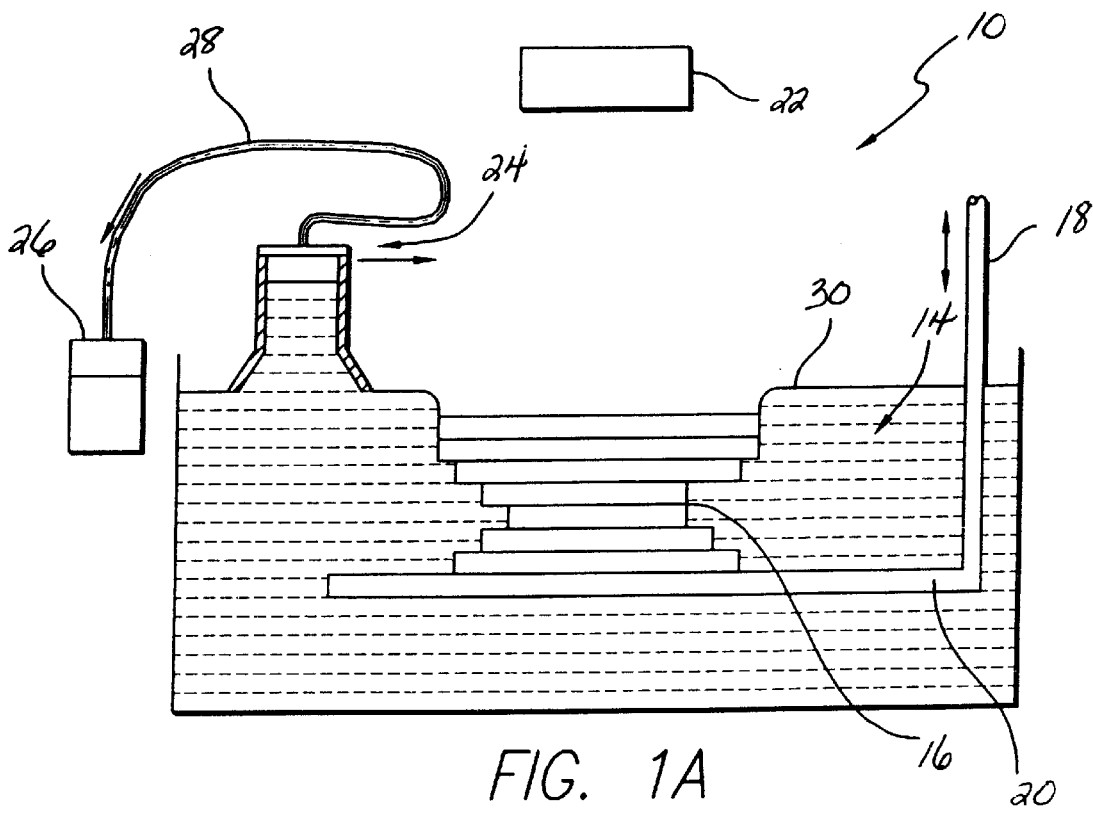
FIGS. 1a and 1b depict side views of a preferred stereolithography apparatus for practicing the instant invention.
Figure 1B:
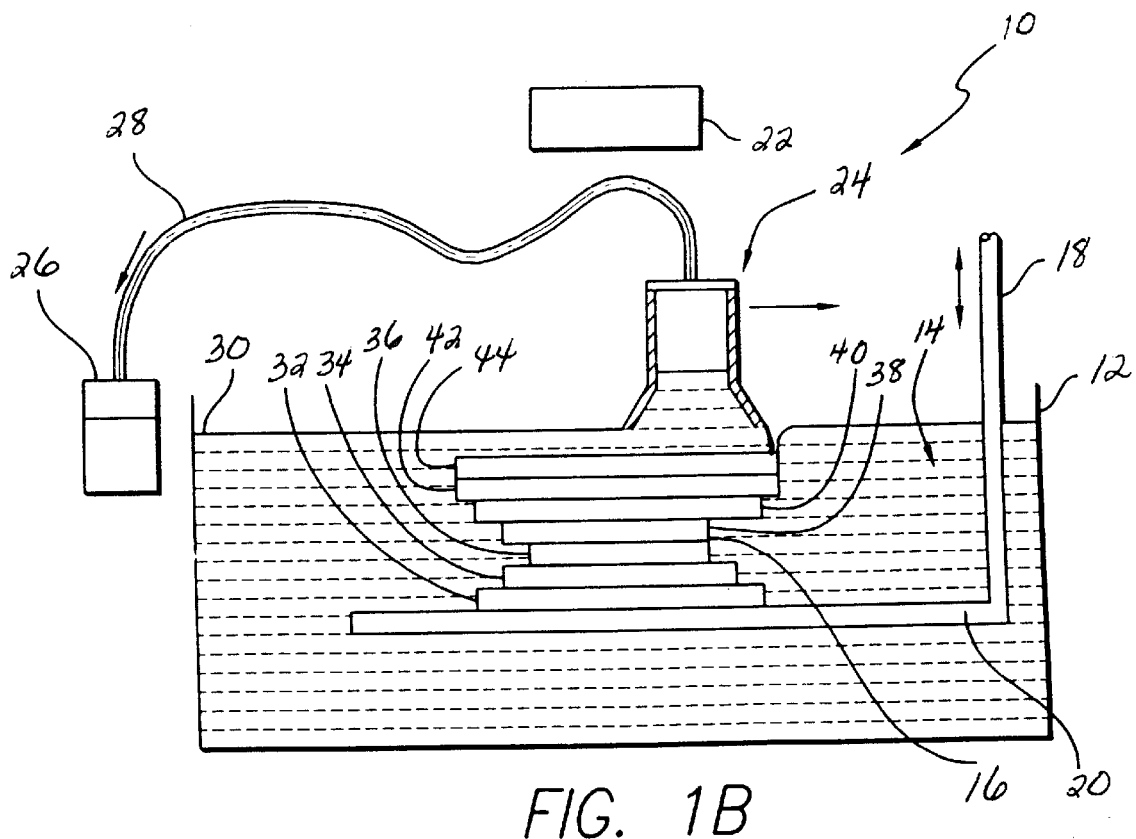

FIGS. 1a and 1b depict schematic representations of a preferred stereolithography apparatus 10 (SLA) for use with the instant invention. The basic components of a stereolithography apparatus are described in U.S. Pat. No. 4,575,330 issued Mar. 11, 1986, to Hull; U.S. Pat. No. 5,184,307 issued Feb. 2, 1993, to Hull, et al.; and U.S. Pat. No 5,182,715 issued Jan. 26, 1993, to Vorgitch, et al. as referenced above. The preferred stereolithography apparatus as shown in FIGS. 1a and 1b includes container 12 (i.e. vat) for holding building material 14 (e.g. photopolymerizable material) from which an object 16 will be formed, an elevator 18 and elevator driving means (not shown), an elevator platform 20, an exposure system 22, a recoating bar 24 and recoating bar driving means (not shown), and at least one computer for manipulating object data (as needed) and for controlling the exposure system, elevator, and recoating devices.

A preferred scanning system is described in several of the patents, applications and publications referenced above including U.S. Pat. No. 5,058,988 issued Oct. 22, 1991, to Spence; U.S. Pat. No. 5,059,021 issued Oct. 22, 1991, to Spence, et al.; U.S. Pat. No. 5,123,734 issued Jun. 23, 1992, to Almquist, et al.; U.S. Pat. No. 5,133,987 issued Jul. 28, 1992, to Spence, et al.; and U.S. Pat. No. 5,840,239 issued Nov. 24, 1998, to Partanen, et al. herein incorporated by reference. This preferred system includes the use of a laser, beam expander (may be separate or included in the laser), and a pair of computer controlled XY rotatable scanning mirrors of either the motor driven or galvanometer type.

Preferred control and data manipulation systems and software are described in a number of the patents referenced above, including U.S. Pat. No. 5,184,307 issued Feb. 2, 1993, to Hull, et al.; U.S. Pat. No. 5,321,622 issued Jun. 14, 1994, to Snead, et al.; and U.S. Pat. No. 5,597,520 issued Jan. 28, 1997, to Smalley, et al. herein incorporated by reference. A preferred recoating device is described in U.S. Pat. No. 5,902,537 as referenced above and includes recoater bar 24, regulated vacuum pump 26, and vacuum line 28 connecting the bar 24 and the pump 26.

Other components of a stereolithography apparatus (not shown) may include a liquid level control system, a build chamber, an environmental control system including a temperature control system, safety interlocks, a viewing device, and the like. It should be understood that the instant invention is applicable to object formation using a system that lacks one or more of the elements mentioned herein, and is applicable to a system that includes all elements mentioned herein, or adds additional elements.

Stereolithography apparatuses on which the instant invention can be utilized are available from 3D Systems, Inc. of Valencia, California. These include stereolithography apparatuses using a HeCd laser operating at 325 nm, and stereolithography apparatus using a solid state laser operating at 354.7 nm. Preferred building materials are photopolymerizable materials manufactured by CIBA Specialty Chemicals of Los Angeles, Calif., and are available from 3D Systems, Inc. These materials manufactured by CIBA Specialty Chemicals include SL 5170, SL 5190, SL 5195, SL 5220, SL 5510, and SL 5520.

The typical operation of a stereolithography apparatus involves alternating formation of layers of material (i.e. coatings of material) and the selective solidification of those layers to form an object from a plurality of adhered laminae. The process typically begins with the elevator platform 20 immersed approximately one layer thickness below the upper surface 30 of the photopolymerizable material 14. The layer of photopolymerizable material is selectively exposed to stimulation (e.g. a beam of UV radiation) which cures the material to a desired depth to form an initial lamina of the object adhered to the elevator platform. This initial lamina corresponds to an initial cross-section of the object to be formed or corresponds to supports, which may be used to adhere the object to the platform. After formation of this initial lamina, the elevator platform and adhered initial lamina are lowered a net amount of one layer thickness into the material.

As the material is typically viscous, and the thickness of each layer is very thin (e.g. 0.025 mm to 0.25 mm (0.001 to 0.010 inch)), the material may not readily form a layer over the last solidified lamina. In the case where a layer is not readily formed, a recoating device may be swept at or somewhat above the surface of the resin (i.e. working surface of the material) to aid in the formation of a fresh layer of material. The layer formation process may involve the sweeping of the recoating bar 24 one or more times at a or velocities. After formation of this second layer of material, a portion of this second layer is solidified by exposure of the medium to stimulation according to data representing a second cross-section of the object. In alternative processes, layer formation over one portion of a previous lamina may occur simultaneously with exposure of an already formed portion of the layer. This process of layer formation and solidification is repeated over and over again until the object 16 is formed from a plurality of adhered layers (32, 34, 36, 38, 40, 42, and 44) as shown in FIG. 1b.

Figure 2:
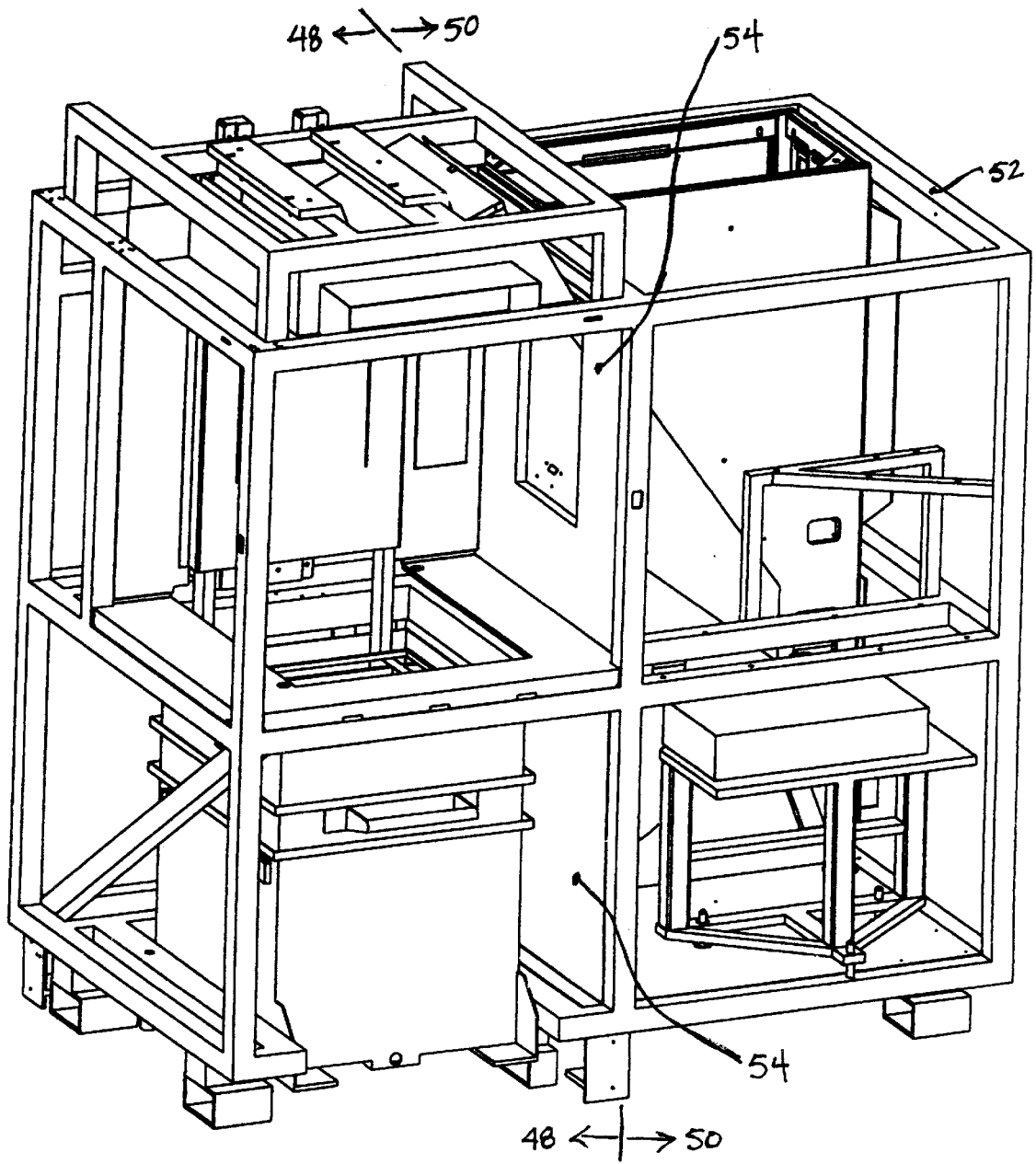
FIG. 2 is a trimetric view from the front-left of a preferred stereolithography apparatus for practicing the instant invention, with outer covers removed.

In a preferred embodiment of the invention, a preferred stereolithography apparatus as shown in FIG. 2 includes a process module 48 and an electro-optical module 50 within an area defined by an outer frame 52. These two modules are preferably separated by a wall 54. This wall prevents any substantial amount of heat transfer from one module to the other. More particularly, this wall prevents any substantial heat transfer by airflow from one module to the other. Covers (not shown) are preferably attached, permanently or typically removably, to the outer frame 52 using any number of connecting means, such as fixtures, adhesives, and/or fasteners. Examples of such means include screws, nails, dowels, magnets, latches, clamps, hinges, snap-fit couplings, rivets, welds, hook and loop fasteners, double-sided adhesive tape, and glue.

The outer frame 52 and its covers are the preferred structure for enclosing the process module 48 and the electro-optical module 50. In another alternative, rather than a frame with covers, a structure may be provided that has no separate frame, or that is not fully covered. Structures may comprise one or more pieces, and may be made of sheet metal, formed or molded plastic, wood, or other material or materials.

Figure 3:
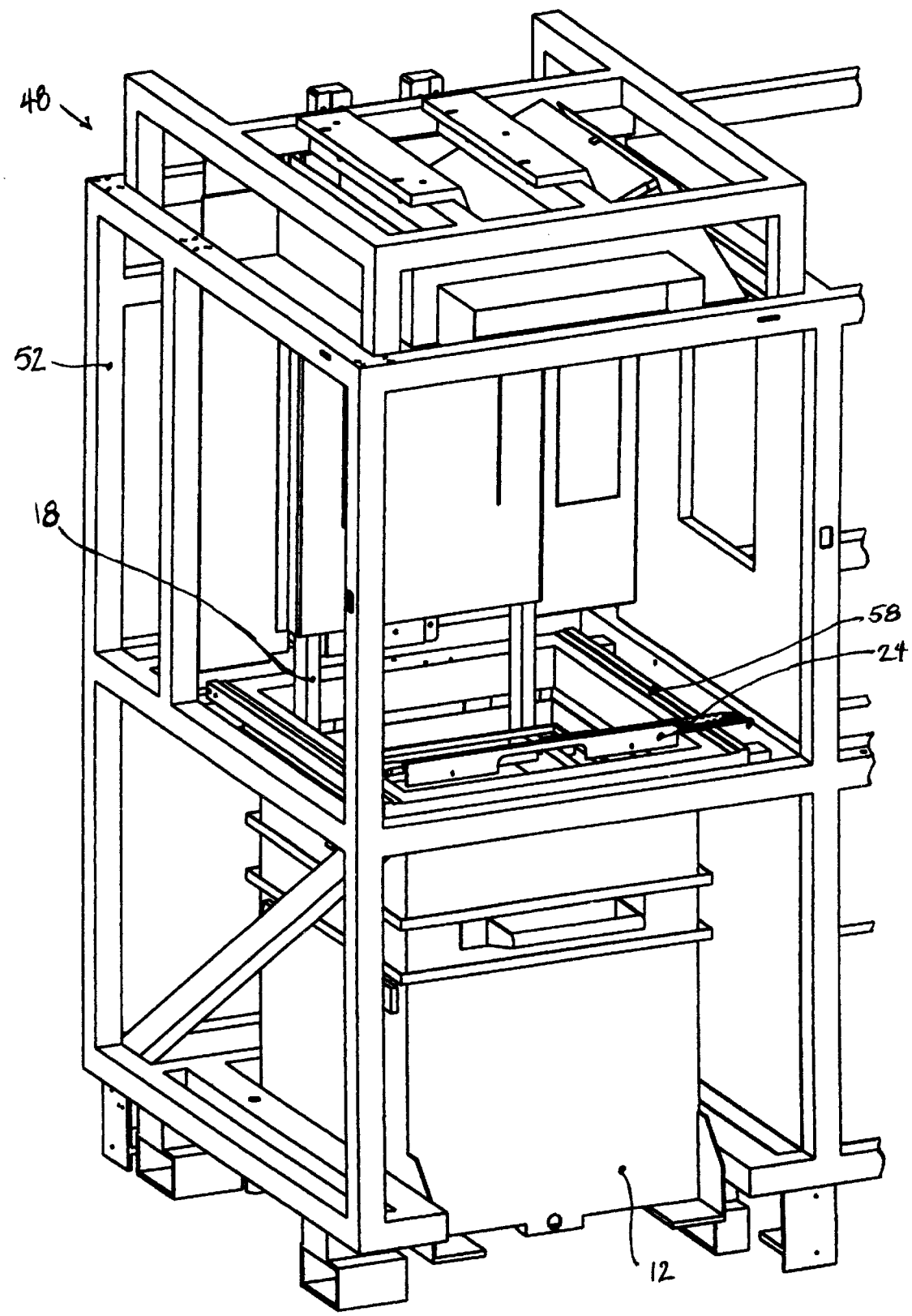
FIG. 3 is a trimetric view from the front-left of a preferred stereolithography apparatus for practicing the instant invention, showing the process module with outer covers removed.
Figure 4:
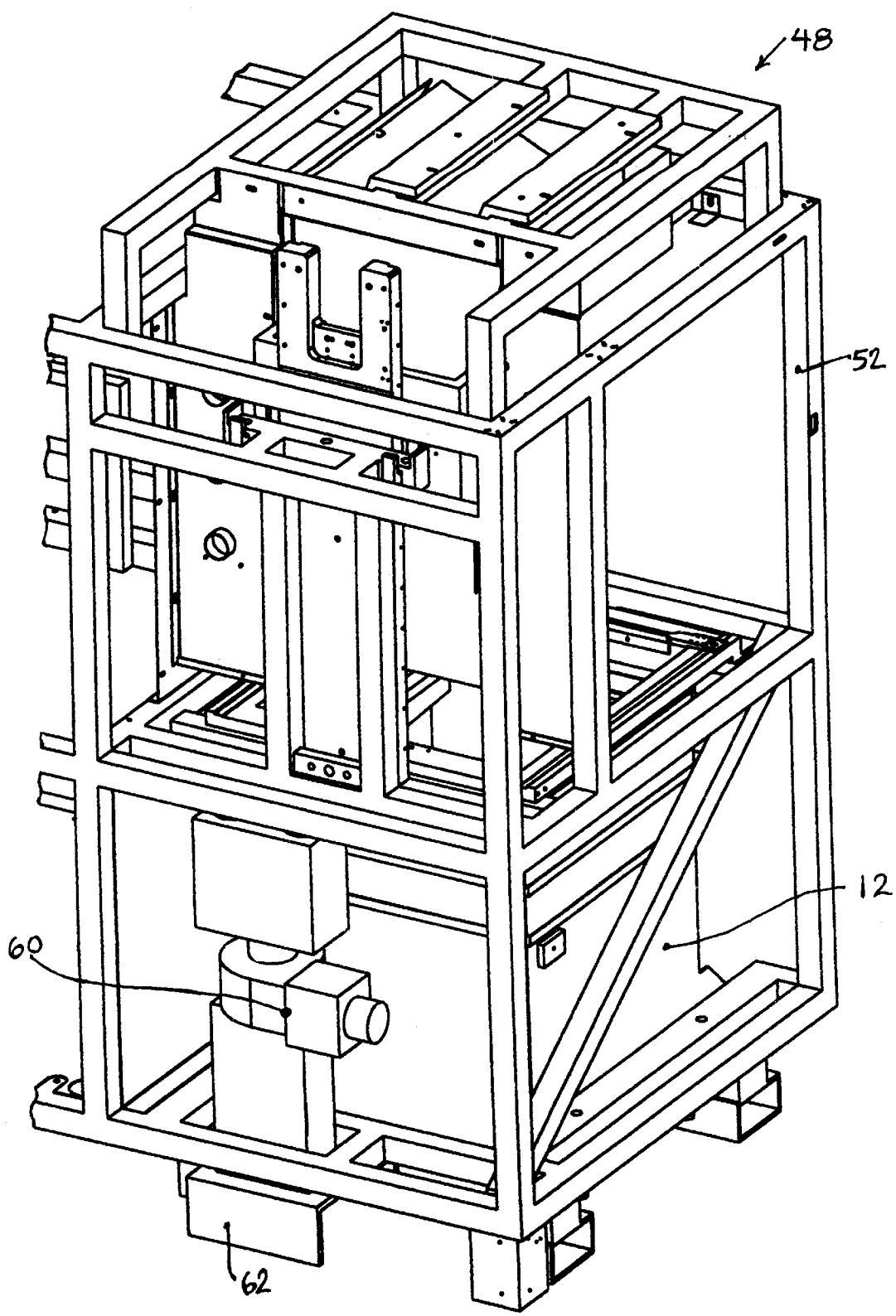
FIG. 4 is a trimetric view from the rear-left of a preferred stereolithography apparatus for practicing the instant invention, showing the process module with outer covers removed.

As seen in FIGS. 3 and 4, the process module 48 may include at least a container 12 for fluid (not shown), devices for moving the container up and down (not shown), an elevator 18 for moving a platform (not shown) up and down in the fluid, a recoating bar 24 that travels on a rim 58 situated around the container 12, and a heater fan/motor 60 and heating ducts (not shown) to provide heat as needed to the process module. The heater fan/motor 60 preferably sits on a base 62 that directly contacts the floor, and does not contact the outer frame 52. In this way, any vibration produced by the heater motor/blower 60 is not transmitted to any other components via the frame 52. Alternatively, the base 62 may be mounted to a vibration-damping device that contacts the floor or mounts to the outer frame 52. Various other process module components are not shown. For instance, a large reflecting mirror, additional optics, and a system for maintaining the level of the fluid may also be contained in the process module 48.

Figure 5:
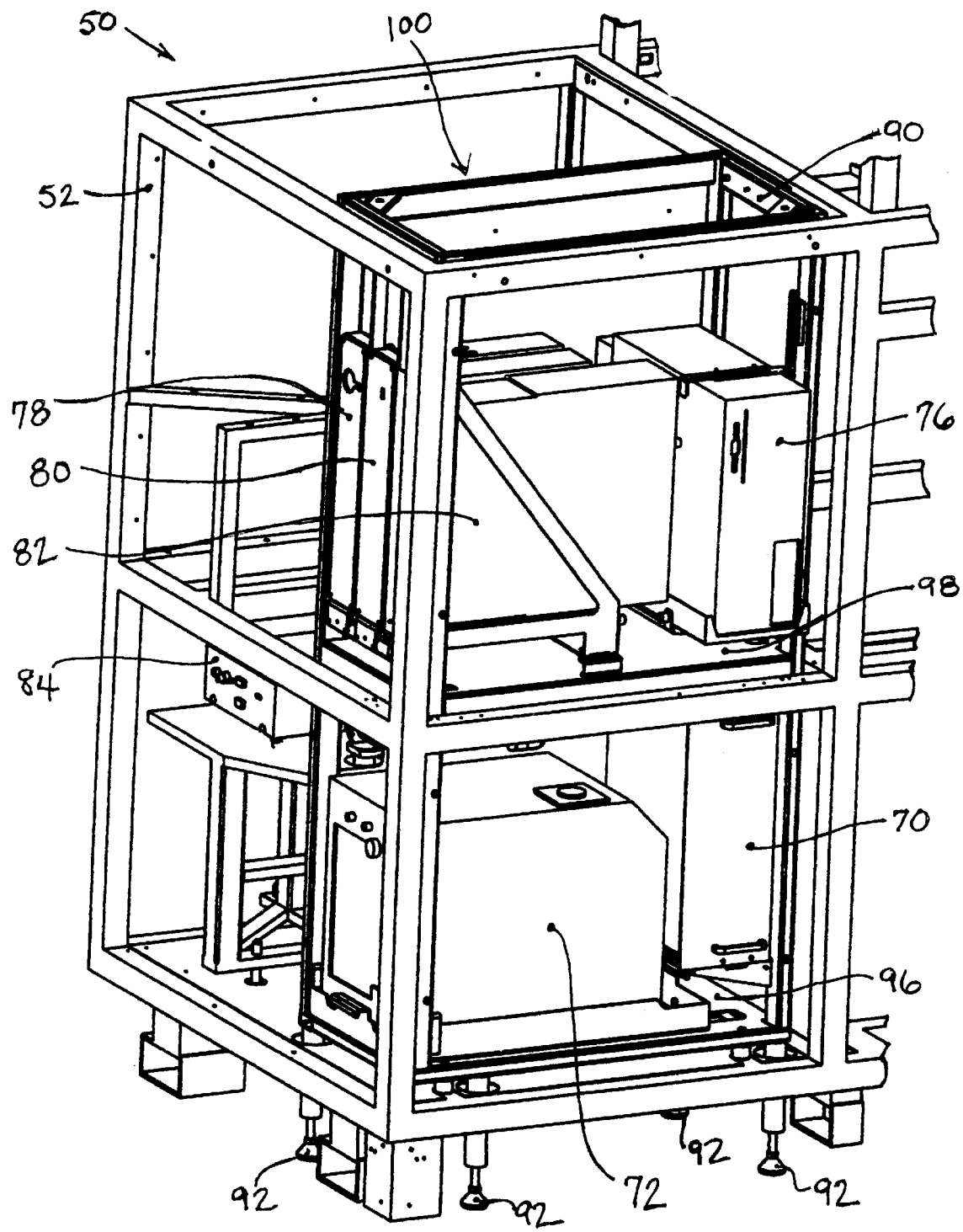
FIG. 5 is a trimetric view from the rear-right of a preferred stereolithography apparatus for practicing the instant invention, showing the electro-optical module with outer covers removed and some enclosure covers removed.
Figure 6:
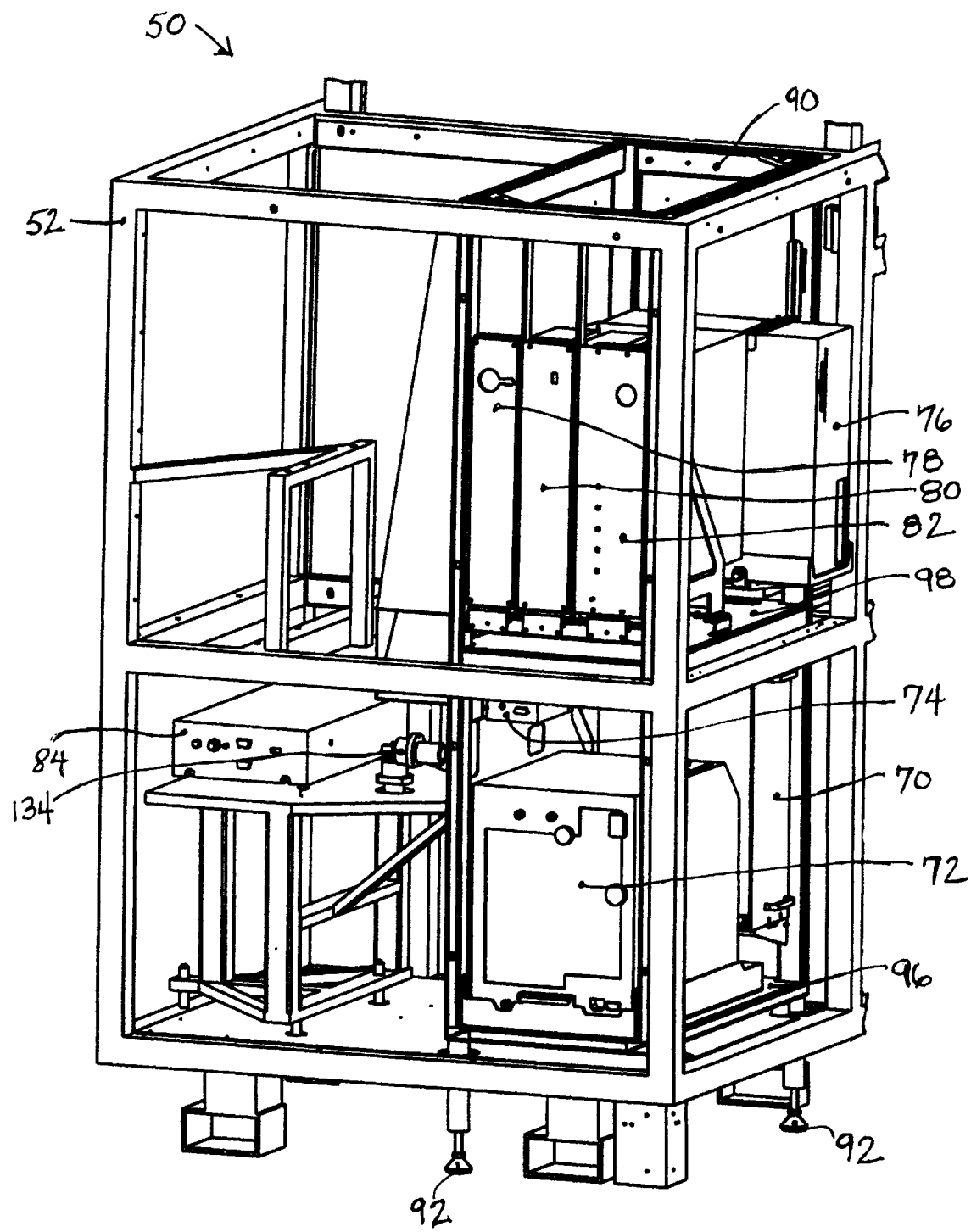
FIG. 6 is a trimetric view from the right-rear of a preferred stereolithography apparatus for practicing the instant invention, showing the electro-optical module with outer covers removed and some enclosure covers removed.
Figure 7:
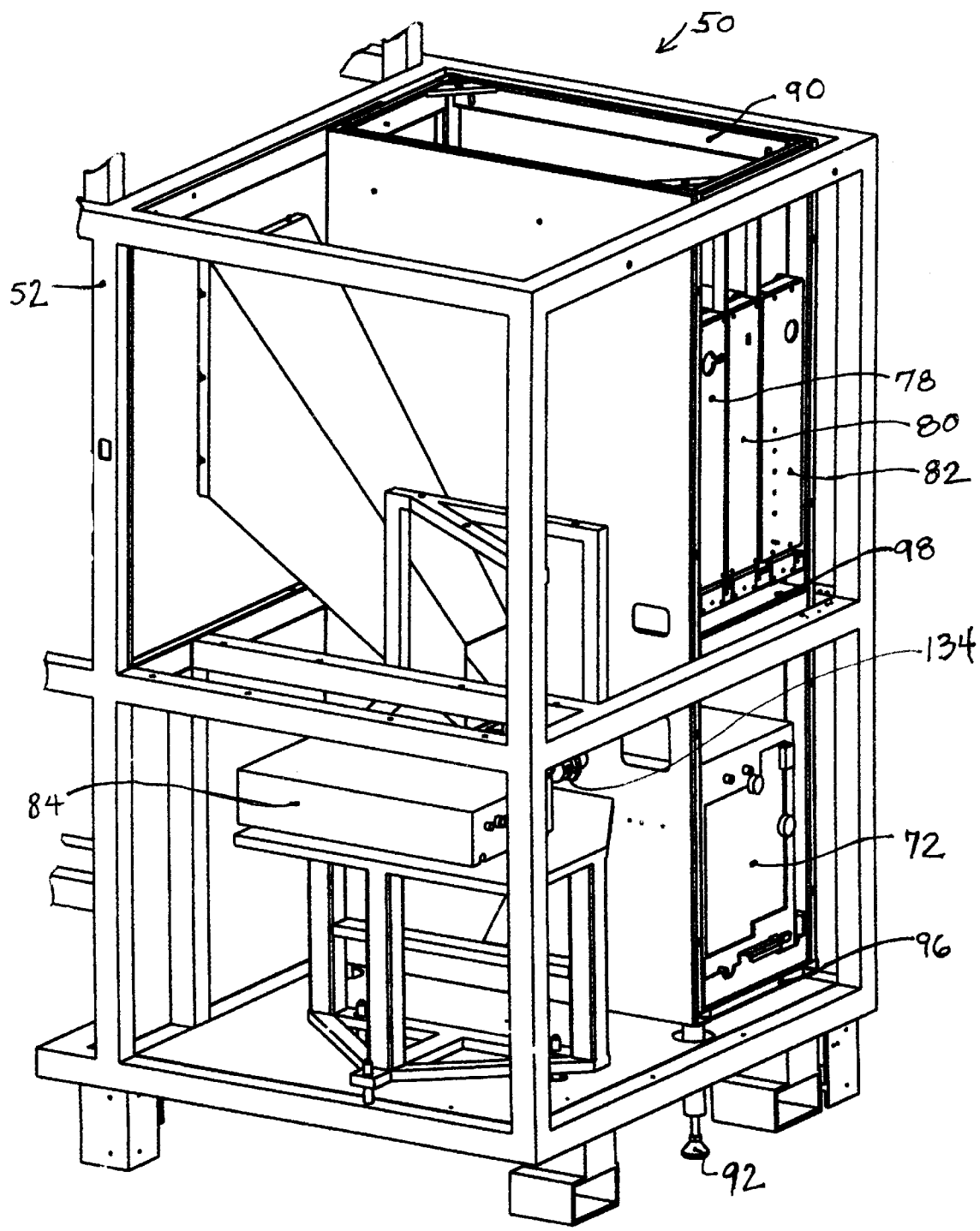
FIG. 7 is a trimetric view from the front-right of a preferred stereolithography apparatus for practicing the instant invention, showing the electro-optical module with outer covers removed and some enclosure covers removed.
Figure 8:
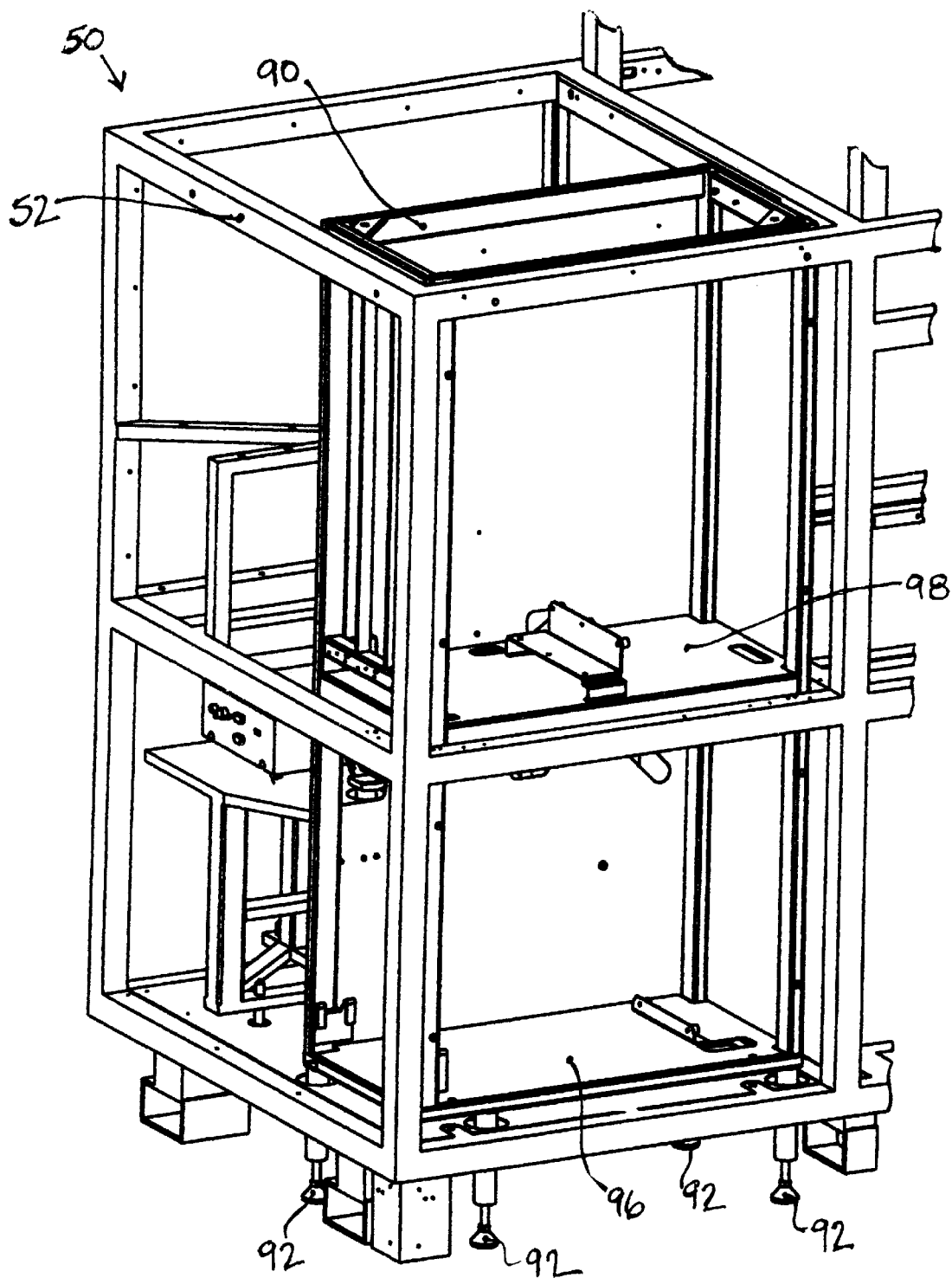
FIG. 8 is a trimetric view from the rear-right of a preferred stereolithography apparatus for practicing the instant invention, showing the electro-optical module with outer covers removed, some enclosure covers removed, and components from within the enclosure removed.
Figure 9:
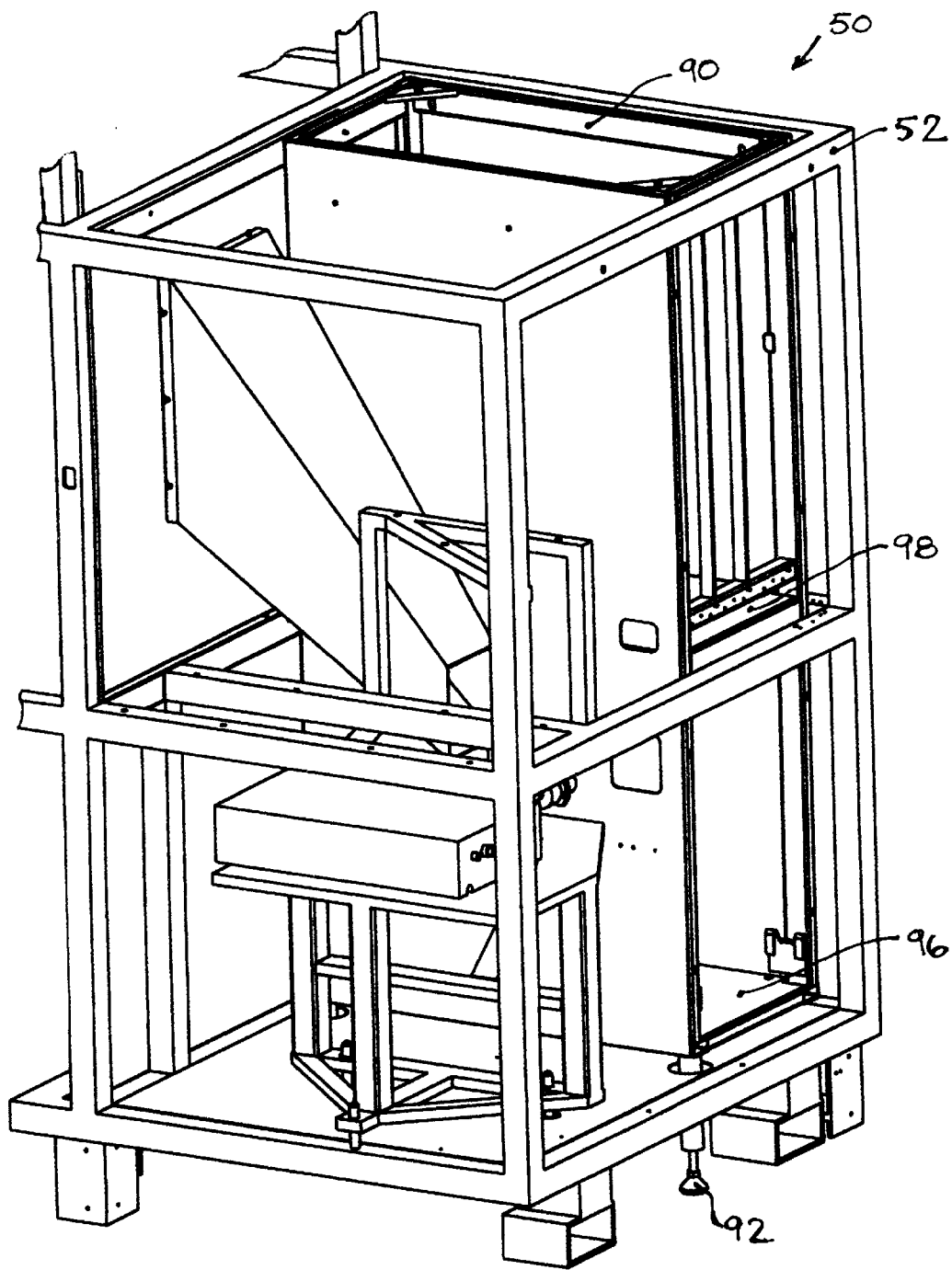
FIG. 9 is a trimetric view from the front-right of a preferred stereolithography apparatus for practicing the instant invention, showing the electro-optical module with outer covers removed, some enclosure covers removed, and components from within the enclosure removed.
Figure 10:
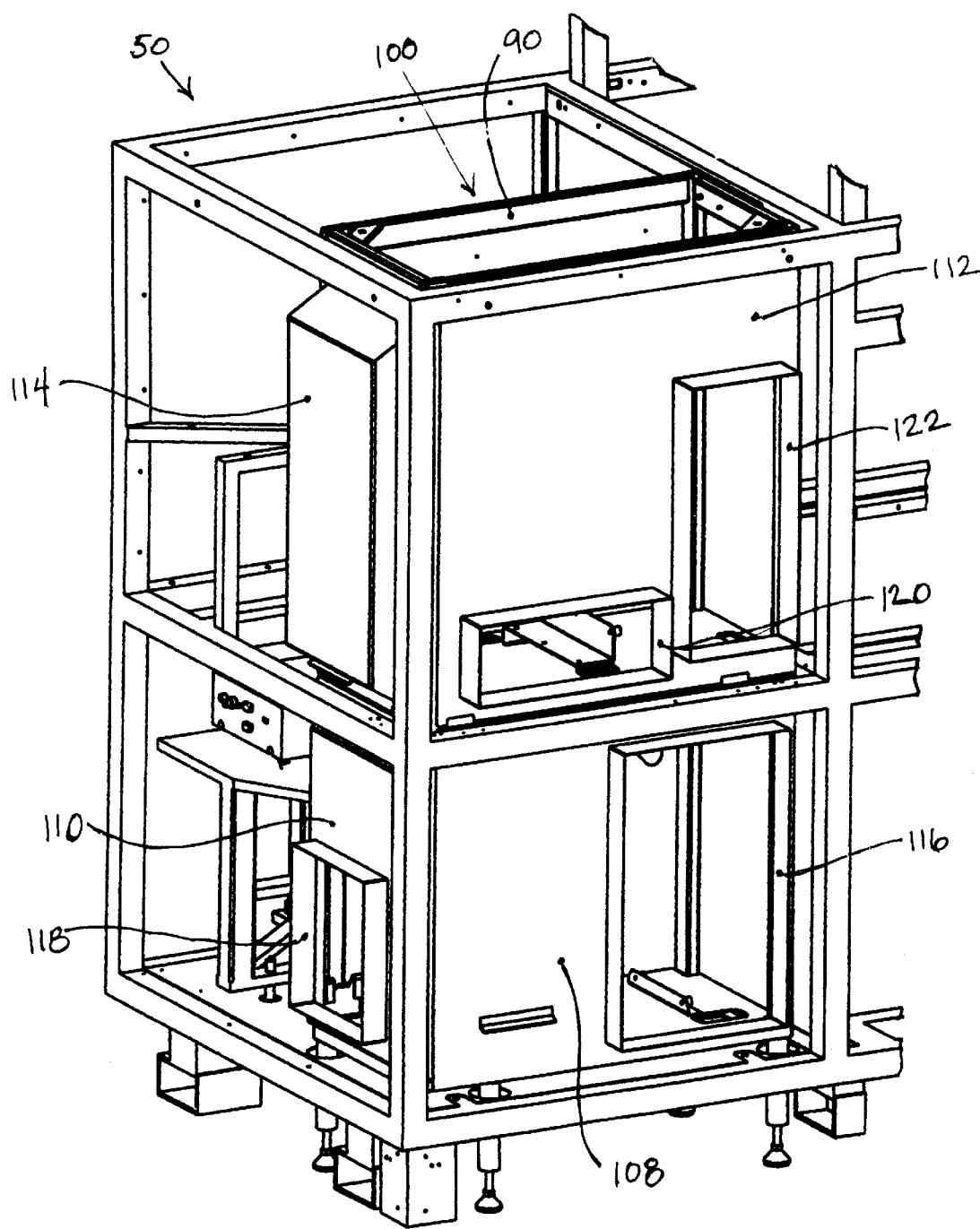
FIG. 10 is a trimetric view from the rear-right of a preferred stereolithography apparatus for practicing the instant invention, showing the electro-optical module with outer covers removed enclosure covers in place, and components from within the enclosure removed.
Figure 11:
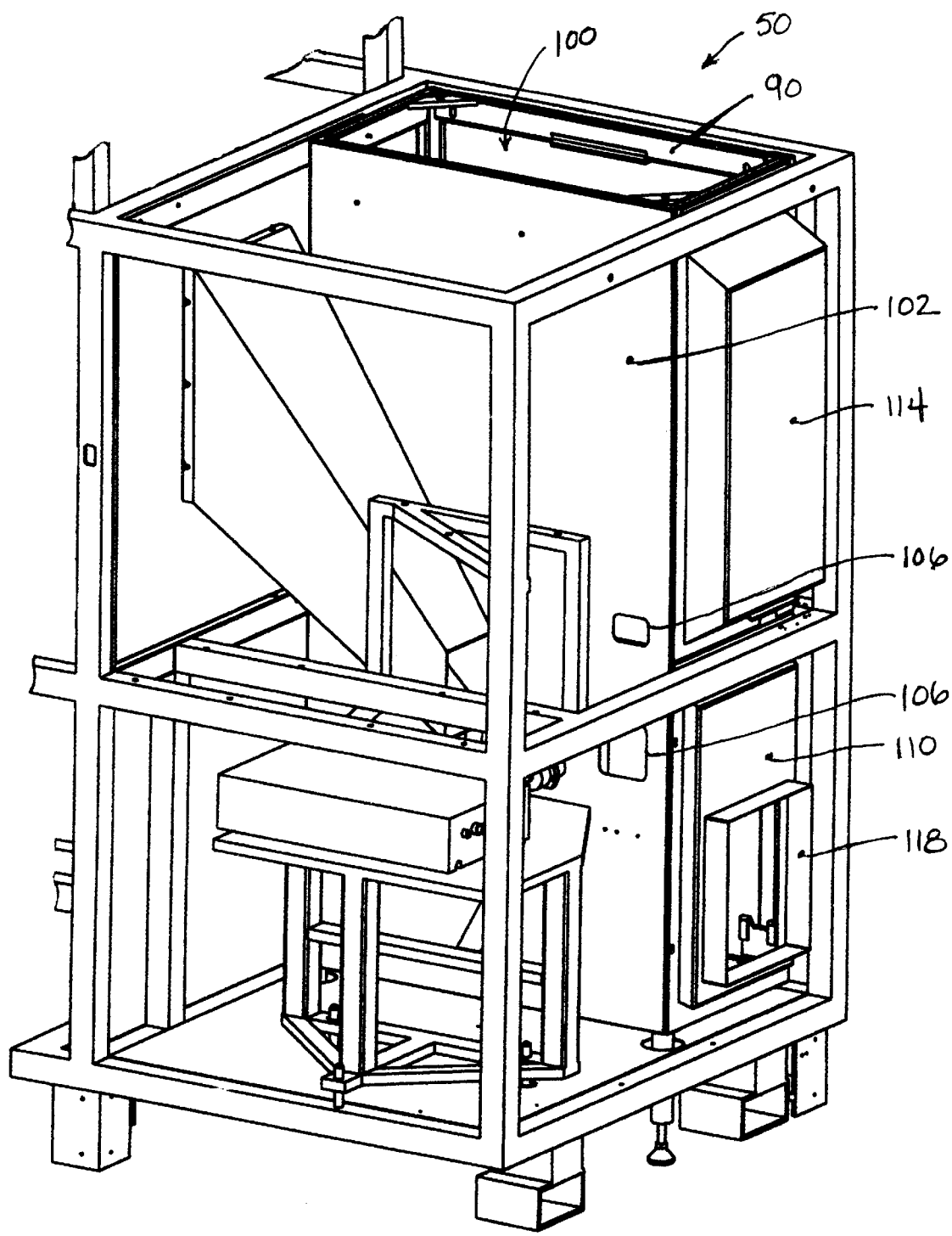
FIG. 11 is a trimetric view from the front-right of a preferred stereolithography apparatus for practicing the instant invention, showing the electro-optical module with outer covers removed enclosure covers in place, and components from within the enclosure removed.
Figure 12:
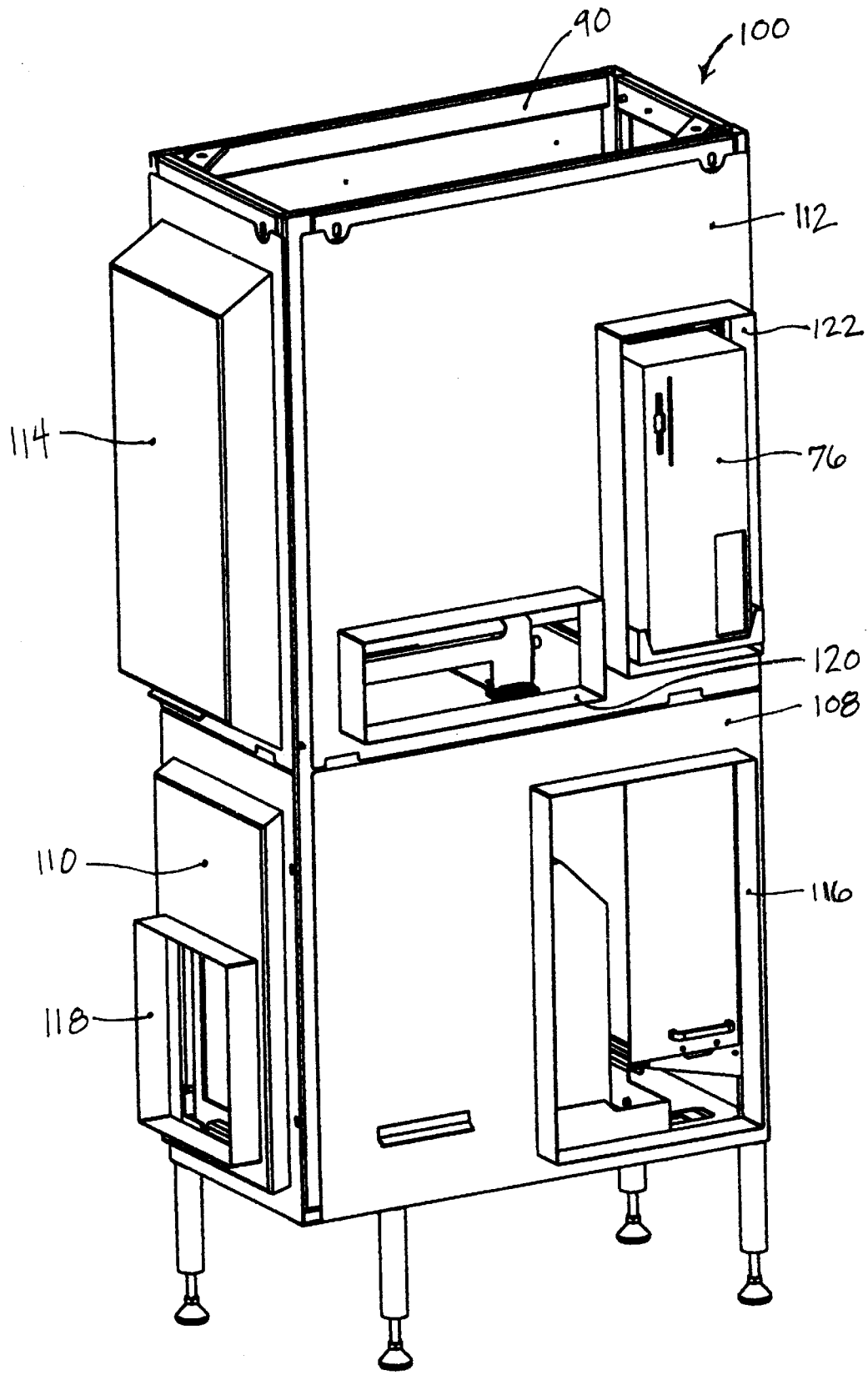
FIG. 12 is a trimetric view, from the rear-right of the enclosure of a preferred stereolithography apparatus for practicing the instant invention.

A typical electro-optical module 50 of a preferred stereolithography apparatus is shown in FIGS. 5, 6 and 7. The electro-optical module may contain a laser power supply 70, a recirculating chiller 72, an infrared laser diode module 74, a computer 76, a mirror driver electrical chassis 78, a chamber controller electrical chassis 80, a machine power supply electrical chassis 82, a laser head 84 including a frequency conversion crystal (not shown), and scanning mirrors (134). Various other electro-optical module components are not shown. For instance, cooling lines and electrical and/or optical cables may also be contained in the electro-optical module. A number of the components in the electro-optical module create heat, not as their purpose, but as a byproduct. Thus, these components may be referred to as peripheral heat-producing components.

Electro-optical components are components that are only electrical, that are only electronic, and that are only optical, or are any combination thereof. The electro-optical module typically contains electro-optical components, as well as components that are not electro-optical.

As shown in FIGS. 5–9, a second frame 90 is located in the electro-optical module 50. The second frame 90 is preferably not mounted to the outer frame 52, and preferably does not touch the outer frame 52. The second frame preferably sits on the floor on four feet 92. This second frame 90 occupies a volume within the outer frame 52. A first shelf 96 is typically provided near the bottom of the volume, roughly 250 mm (10 inches) above the feet. The volume within the second frame is preferably divided into upper and lower sections by a second shelf 98.

Referring now to FIGS. 10–14, the second frame 90 with its covers 102, 104, 108, 110, 112, and 114 may be referred to as an enclosure 100. This enclosure 100 sits inside the electro-optical module 50. Use of the word enclosure does not require that the volume be completely enclosed. The purpose of this enclosure is to aid in the isolation of heat and/or vibration produced by the components it contains, from at least one component that is outside the enclosure but inside the outer frame. It is preferable to limit vibration and maintain as stable a temperature as possible outside the enclosure but inside the outer frame. As such, any openings in the enclosure that interface to the external environment will not typically detract from this purpose. Thus, given this context, the area of any opening to the external environment is considered to still be part of the structure. The enclosure may provide over about 50%, or more preferably over 60%, or most preferably over 80% of a structure for covering the sides of the volume.

Referring again to FIGS. 5, 6, and 7, the laser power supply 70, recirculating chiller 72, and infrared laser diode module 74 are preferably located in the lower section of the enclosure 100. The computer 76, mirror driver electrical chassis 78, chamber controller electrical chassis 80, and machine power supply electrical chassis 82 are preferably located in the upper section of the enclosure.

Figure 13:
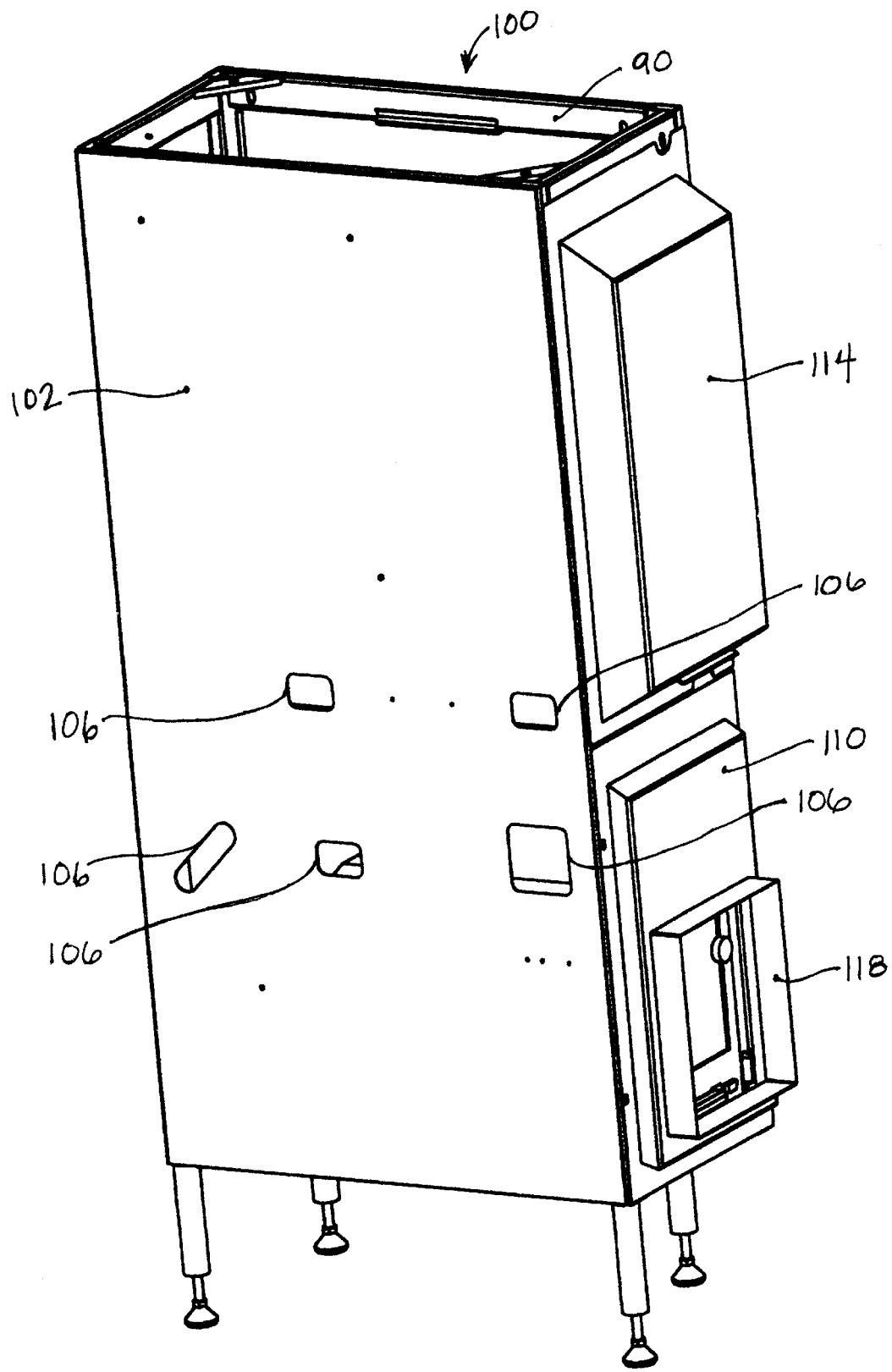
FIG. 13 is a trimetric view, from the front-right of the enclosure of a preferred stereolithography apparatus for practicing the instant invention.
Figure 14:
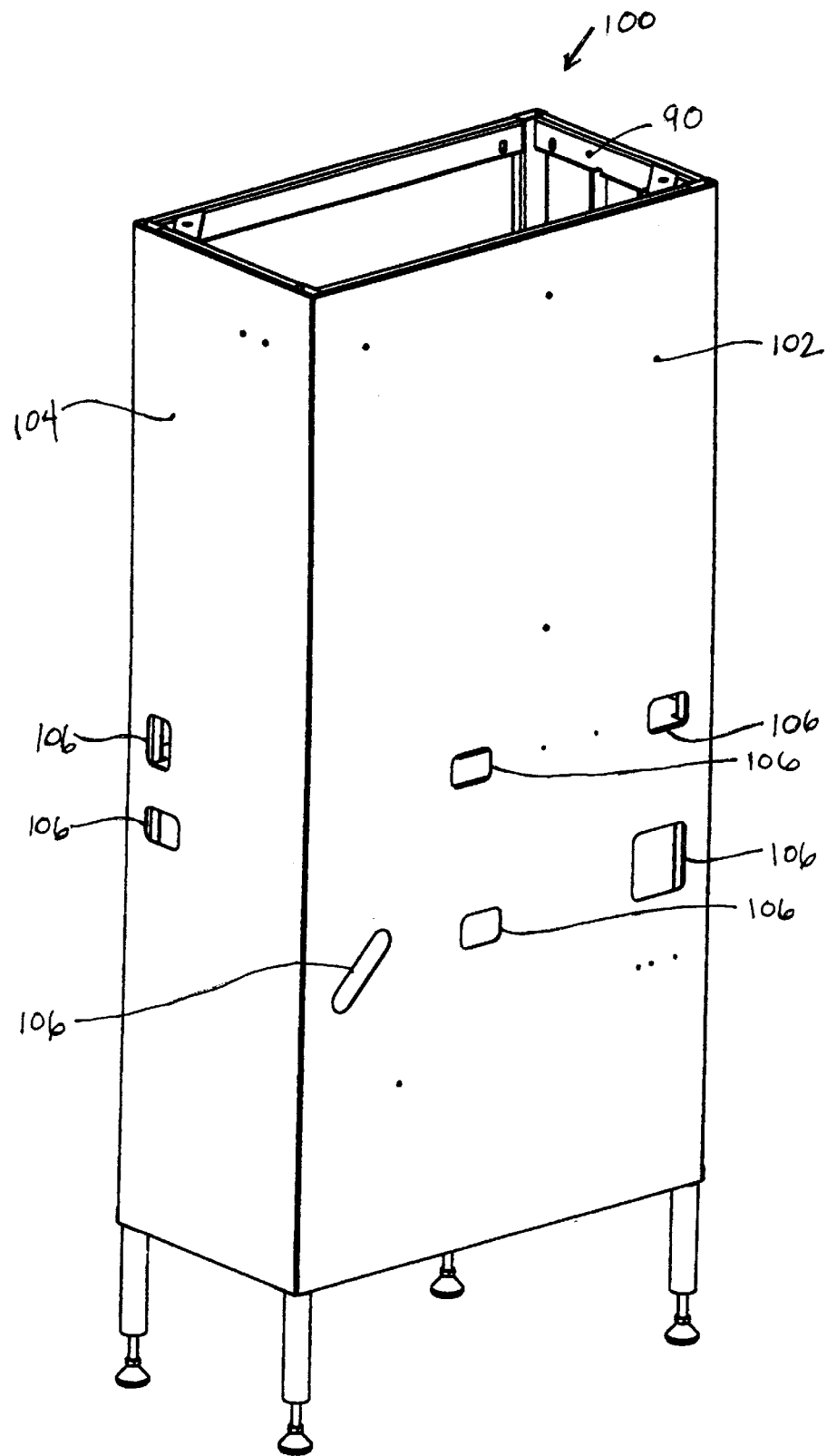
FIG. 14 is a trimetric view, from the left-front of the enclosure of a preferred stereolithography apparatus for practicing the instant invention.

As seen in FIGS. 13 and 14, attached to the second frame 90 on two sides, typically via welds, are covers 102 and 104, preferably with slots 106 to allow cable access. These slots account for preferable less than 40%, more preferably less than 25%, and most preferably less than 10% of the surface area of the covers 102 and 104.

Referring again to FIGS. 10–13, on the remaining two sides of the enclosure, it is preferred that removable access covers 108,110,112, and 114 attach to the second frame 90. The covers 108 and 110 for the lower section of the enclosure may have at least one opening 116 where ambient air is drawn in before it is forced to flow around or through at least one component, and at least one opening 118 where this air is released back to the external environment. The entire path for this forced air is preferably within the lower section of the enclosure, as defined by the second shelf 98. In an alternative, air may be drawn in and released out through a single opening. Of course, the path for the forced air may be in a location other than the lower section of the enclosure.

The covers 112 and 114 for the upper section of the enclosure may have at least one opening 120 to enable air to flow into the volume defined by the upper section of the enclosure, to increase convection (i.e. natural convection and/or forced convection) through the volume, and out beyond the outer frame. Therefore, it is preferable that the top of the enclosure 100 remain substantially uncovered. It is preferred that at least about 40% of the heat from the peripheral heat-producing components be directed upward, toward the top of the enclosure, via convection. More preferably, at least about 60% of the heat, and most preferably at least about 70% of the heat will be directed upward via convection.

The covers for the sides of the upper section of the enclosure may also have at least one opening 122 to allow access to a component within the electro-optical module, such as the computer 76. Any such opening would preferably fit snugly around the component, to reduce airflow around the component.

Figure 15:
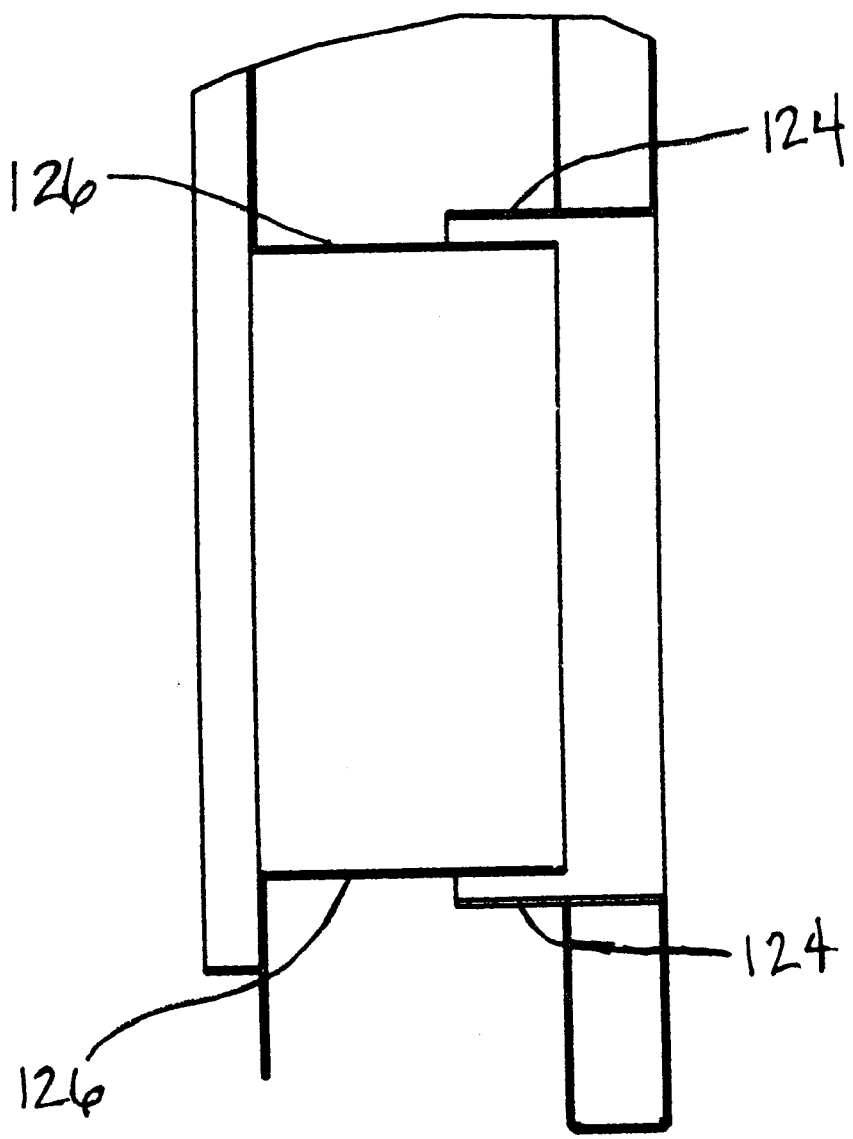
FIG. 15 is a partial section view of overlapping flanges of covers from a preferred stereolithography apparatus for practicing the instant invention.

As stated above, openings 116,118,120, and 122 are provided in the covers attached to the second frame of the enclosure 100. In the locations of these openings, it may be preferable that the covers attached to the outer frame have an opening, a grille, a grating, or the like. For openings 116, 118, and 120 in particular, which are provided to enable air to flow into and out of the enclosure 100, it is preferable that the configuration of the outer frame allow air to move relatively easily from the enclosure to the external environment, or from the external environment to the enclosure. To better control this airflow into the enclosure and out of the enclosure, it is more preferred that the openings in the covers for the second frame and the openings in the covers for the outer frame be nested, non-contacting flanges similar to 124 and 126 shown in FIG. 15. In an alternative, the inner flange may be formed in the desired direction of the airflow.

Figure 16:
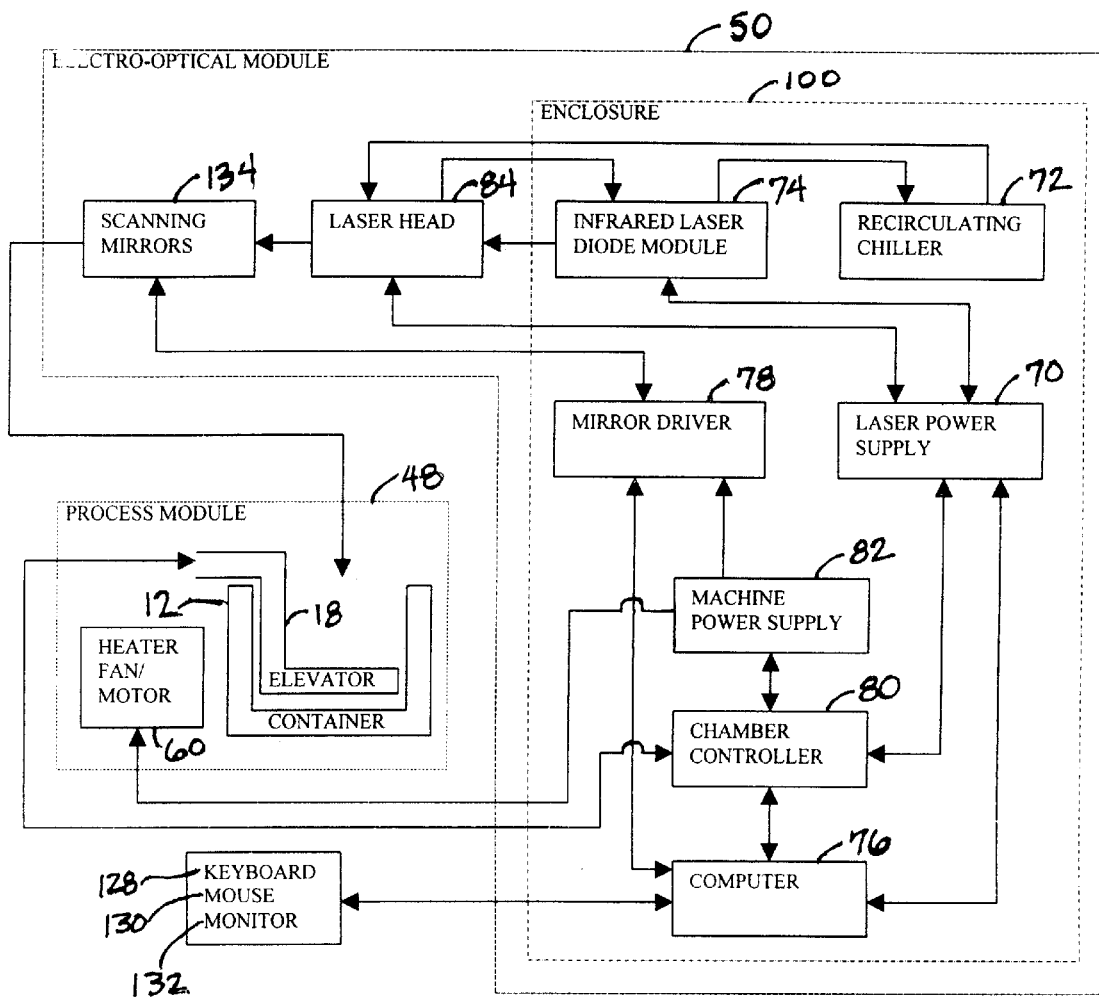
FIG. 16 is a schematic diagram illustrating control functionality of a preferred stereolithography apparatus for practicing the instant invention.

Preferred control functionality relationships of the various components described above is depicted in the schematic diagram of FIG. 16. The computer 76 receives instructions through the keyboard 128 and mouse 130, and displays information back to the monitor 132. The computer 76 also sends commands to the laser power supply 70, and receives status information back from the laser power supply. The laser power supply 70 also receives control signals from the chamber controller 80 to control the ultraviolet output power of the laser, and sends status information back to the chamber controller 80. The laser power supply 70 sends power to the infrared laser diode module 74 and to the laser head 84, and receives status information back from the infrared laser diode module and from the laser head.

The laser head 84 receives coolant from the recirculating chiller 72. The laser head 84 passes coolant to the infrared laser diode module 74. The infrared laser diode module 74 passes coolant back to the recirculating chiller 72. The infrared laser diode module 74 produces radiation that it passes to the laser head 84. After modifying the radiation, the laser head 84 passes a beam of ultraviolet radiation to the scanning mirrors 134.

The mirror driver 78 sends the present position of the scanning mirrors 134 to the computer 76. The computer determines the desired position of the scanning mirrors 134. The computer then sends control signals to the mirror driver 78, and the mirror driver sends the appropriate control signals to the scanning mirrors 134 to move the mirrors to the new position.

Between the computer 76 and the chamber controller 80 is a bi-directional data bus. The chamber controller 80 sends motor drive signals to the elevator 18 and receives status signals back. The chamber controller 80 also sends commands through the machine power supply 82 to control the heater 60. Temperature sensors (not shown) send status signals back through the machine power supply 82 to the chamber controller 80. Alternatively, the temperature sensors may send status signals directly to the chamber controller 80.

The machine power supply 82 supplies power for the mirror driver 78 circuitry, to move the scanning mirrors 134. Given the supplied power, the scanning mirrors 134 move, based on the signals sent from the computer 76 through the mirror driver 78, and direct the beam of ultraviolet radiation received from the laser head 84 on the photopolymerizable material located in the container 12. After each layer of photopolymerizable material is solidified, the elevator 18 receives signals from the chamber controller 80 to descend one layer thickness into the container 12. Each layer is solidified, from bottom to top, to form a three-dimensional object.

The isolation aspect of this invention is also depicted in the schematic diagram of FIG. 16. As can be seen in the Figure, the computer 76, chamber controller 80, machine power supply 82, mirror driver 78, laser power supply 70, recirculating chiller 72, and infrared laser diode module 74 are located within the enclosure 100, which is, in turn located in the electro-optical module 50.

Figure 17:
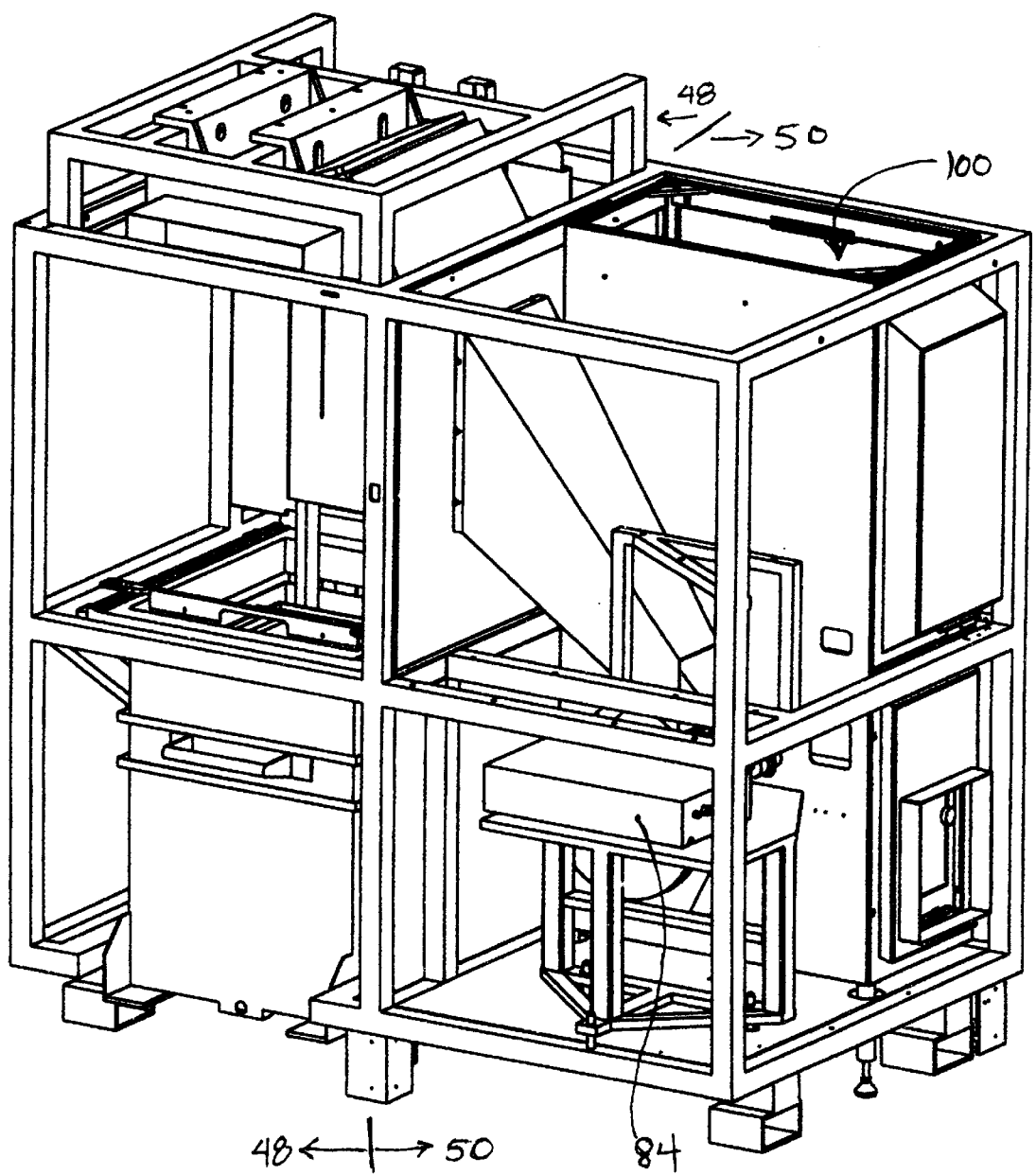
FIG. 17 is a trimetric view from the front-right of a preferred stereolithography apparatus for practicing the instant invention, with outer covers removed.

As depicted in FIGS. 16 and 17, the laser head 84 is preferably located within the electro-optical module 50. However, the laser head 84 is preferably located outside the enclosure 100 that defines a volume within the electro-optical module 50. The laser head 84 is also located outside the process module 48. As described earlier, the heater fan/motor 60 is a controllable source of variable heat, and is also a source of vibration. Many of the components in the enclosure 100 produce heat and/or vibration as a byproduct. Therefore, at least the laser head 84 is isolated from all these components.

This configuration substantially isolates the laser head from any heat, and particularly variations in heat, produced by peripheral heat-producing components within the enclosure, and from any heat, and particularly variations in heat, produced by components in the process module. In addition, the locating of various components on their own base or within an enclosure within the outer frame, and then not allowing the enclosure or the base to contact the outer frame, prevents a substantial amount of vibration from reaching the laser head. Substantially isolating the laser head from one or both of heat and vibration leads to greater stability of the laser head, with more benefit accruing from addressing both heat and vibration. Increasing the stability of the laser head leads to greater laser beam pointing stability, which in turn leads to improved three-dimensional part building efficiency and accuracy.

Alternatives

Alternative embodiments may vary one or more of the specific parameters utilized in the examples given. For example, a stereolithography apparatus may include more than two modules, or may not be divided into separate modules at all. Modules may define a functional unit, or may define a volume defined by some amount of partition, within the apparatus. If a stereolithography apparatus is not divided into modules, there may be more than one volume defined within the outer frame for containing the heat-producing components and vibration-producing components.

Whether or not modules are used in a stereolithography apparatus, it may not be necessary to use walls to prevent a substantial amount of heat transfer from one area to the other, and to substantially isolate the laser head from heat. The convective circulation of currents in the system may instead be relied upon.

The placement of components in the system may be varied from what is depicted and described in the above embodiment, and the benefits of the invention may still be realized. For instance, if the heater fan/motor were moved into the volume defined by the second frame, the benefits of heat and/or vibration control would still exist. Also, if the positions of the computer and other chassis in the upper section of the volume defined by the second frame were modified, the desired benefits would remain. In addition, the second frame itself does not necessarily need to be located in the electro-optical module. Other modifications to components' locations will be apparent to one of skill in the art.

It is not necessary that the second frame be supported on four feet. It may, for example, have three feet, or more than four, or there may be continuous or near continuous line or area contact with the floor and the frame or frame components. Rather than feet, the frame may be supported on wheels. The first shelf may be provided other than 250 mm (10 inches) above the floor, and the position necessary based on the size of the components. One or both the shelves may be removed, in favor of a rack-mount type design, or other method of suspending the components from the second frame.

Less or more than two covers may be welded to the second frame, and less or more than two sides may be provided with removable covers. For instance, three sides may have welded covers, while only one side may have a removable cover or covers. Or, there may be covers welded on just an upper section, or just a lower section of one or more sides. In another alternative, all sides may have removable covers. In yet another example, less than four sides may have covers at all. For instance, the convective circulation of currents in the system may be such that a removal of cover on one or more sides, or a portion of a side, does not substantially impact the volume of heat removed to the external environment. In this case, removing the cover or covers may not impact the ability to remove heat from the system, but may reduce the cost of the system since fewer components and less assembly are necessary. In addition, rather than having cable access slots in one or more covers, the cables may go over the top of the covers, or through any other existing opening. Finally, not only may covers be welded, they may be attached, permanently or removably, using any number of connecting means, such as fixtures, adhesives, and/or fasteners. Examples of such means include screws, nails, dowels, magnets, latches, clamps, hinges, snap-fit couplings, rivets, welds, hook and loop fasteners, double-sided adhesive tape, and glue.

In another alternative, rather than a second frame with covers, an enclosure may be provided that has no separate frame, or that is not fully covered. Enclosures may comprise one or more pieces, and may be made of sheet metal, formed or molded plastic, wood, or other material or materials.

Alternatives to using convection for removing heat from the enclosure are possible. While natural convection may be sufficient to remove at least as much heat as desired, a combination of natural convection and forced convection may also be employed. This may be accomplished by using one or more fans to draw air from the enclosure. The fans may force air in or out of the enclosure depending on the convection pattern being enhanced. In another alternative, a temperature sensor or sensors may be located within the enclosure, and/or elsewhere in the apparatus. Based on feedback from the sensor(s) in combination with a desired temperature set point or points, a fan or fans for drawing air out of the enclosure may be activated or adjusted. Further details about temperature control are found in previously referenced, concurrently filed U.S. patent application Ser. No. 09/247,113

Also, it is possible to use conduction through a liquid and/or a solid to aid in the removal of heat. For example, a heat sink may be placed over the top of the enclosure. Radiation may also be used to remove heat. For instance, the enclosure may be made to more readily radiate heat to the external environment by painting the top black. It is also possible to remove heat with a phase change device, such as a heat pipe. In addition, a combination of heat transfer processes may be utilized. For example, fluid flow may be used to transfer heat from selected components, frame elements, or panels. In another alternative, one or more thermoelectric cooling devices may be used to remove heat from the enclosure. These thermoelectric devices may be Peltier-effect device arrays with, for instance, natural or forced convection cooling distribution from one side of the Peltier array, and mechanisms for heat removal (for example, natural or forced convection, heat pipe, or closed-loop coolant) on the heated side of the Peltier array. The device or devices would preferably, but not necessarily, be placed substantially over the top of the enclosure. The heat transfer may direct heat to an external environment or may simply be used to homogenize the temperature in selected portions. For instance, the heat may be directed into the process module. The heat transfer techniques described herein may be used alone or in combination to achieve the desired amount of heat transfer.

In yet another alternative, it is possible to affix to one or more covers of the enclosure, or to portions of the wall between the process module and the electro-optical module, an insulating material. This may comprise additional thickness or layers of the existing cover and/or wall material, or the addition of a further material. Further material may be, but is not limited to open or closed-cell foam; glass fiber; reflective material; polystyrene; mineral, wood, and/or paper compositions; cork; and foamed-in-place materials. In addition, evacuated spaces may be used as insulation.

The apparatus in the embodiment and alternatives can be modified according to various teachings in the above incorporated patents and applications. Furthermore, it is believed that the teachings herein can be applied to other Rapid Prototyping and Manufacturing technologies in order to achieve improved system stability, and thus improve the quality of the three dimensional parts produced.

Though a particular embodiment has been described and illustrated and many alternatives proposed, upon review of the teachings herein, many additional embodiments and alternatives will be apparent to those of skill in the art. As such, the embodiment and alternative presented herein are not intended to limit the scope of the invention, but instead to be exemplary in nature.

We claim:

1. A rapid prototyping apparatus comprising:
   a) a process module comprising a first heat-producing component;
   b) electro-optical components, at least one of which is a peripheral heat-producing component, the electro-optical components comprising an exposure system and a computer programmed to control the electro-optical components to form a three dimensional object from a building material located in the process module;
   c) a structure enclosing the process module and the electro-optical components; and
   d) at least one enclosure means within the structure containing at least one of the electro-optical components and the computer for thermally isolating at least one of the electro-optical components from a peripheral heat-producing component.

2. The apparatus of claim 1 wherein the at least one enclosure means within the structure for thermally isolating at least one of the peripheral heat-producing components comprises one enclosure.

3. The apparatus of claim 2 wherein the enclosure and the structure are detached.

4. The apparatus of claim 3 wherein the enclosure is spaced apart from the structure.

5. The apparatus of claim 2 wherein the structure sits on a floor and the enclosure is in direct contact with the floor.

6. The apparatus of claim 2 wherein the structure sits on a floor and the enclosure stands on support means, and wherein the support means are in direct contact with the floor.

7. The apparatus of claim 2 wherein the enclosure incorporates an open top.

8. The apparatus of claim 7 wherein the open top draws a portion of generated heat to ward the open top via convection.

9. The apparatus of claim 2 wherein the enclosure comprises a walled, open topped enclosure useful for drawing a portion of generated heat toward the open top via forced convection.

10. A rapid prototyping apparatus comprising:
    a) a process module comprising a first heat-producing and vibration-producing component;
    b) electro-optical components, at least one of which is one or both of a vibration-producing component and a peripheral heat-producing component comprising an exposure system and a computer for controlling the electro-optical components to form a three dimensional object from a building material located in the process module;
    c) a structure enclosing the process module and the electro-optical components; and
    d) at least one enclosure means within the structure for thermally isolating at least one of the peripheral heat-producing components and for vibrationally isolating at least the first heat-producing and vibration-producing components from at least one of the electro-optical components of the exposure system including a laser head.

11. A rapid prototyping apparatus comprising:
    a) a process module comprising a first heat-producing component;
    b) electro-optical components, at least one of which is a peripheral heat-producing component, comprising an exposure system and a computer for controlling the electro-optical components to form a three dimensional object from a building material located in the process module;
    c) a structure enclosing the process module and the electro-optical components; and
    d) at least one enclosure means within the structure for directing a portion of generated heat from the at least one peripheral heat-producing component upward by convection via an underlying ambient air intake opening and an air release opening.

12. The apparatus of claim 11 wherein heat generated by the heat-producing components is directed through the structure via natural convection.

13. The apparatus of claim 11 wherein the heat generated by the heat-producing components is directed through the structure via forced convection.

14. The apparatus of claim 11 wherein at least one electro-optical componenet is located outside the at least one enclosure means.

15. The apparatus of claim 11 wherein at least 70% of the heat from the peripheral heat-producing components is directed upward via convection.

16. A rapid prototyping apparatus comprising:
a) a process module comprising a first heat-producing and vibration-producing componenet;
b) electro-optical components comprising a laser head, an exposure system and a computer for controlling the electro-optical components to form a three dimensional object from a building material located in the process module, wherein at least one of the electro-optical components are one or both of vibration-producing components and peripheral heat-producing components;
c) a structure enclosing the process module and the electro-optical components; and
d) at least one enclosure means within the structure for isolating the components producing heat and/or vibration from the laser head,
wherein the enclosure means within the structure comprises an open topped enclosure for drawing a portion of generated heat toward the open via convection, the enclosure and the structure being detached and the enclosure being vibrationally isolated from the laser head.

17. The apparatus of claim 16 wherein the enclosure and the structure are spaced apart.

18. The apparatus of claim 16 wherein the enclosure incorporates at least one through slot for accommodating cables.

19. The apparatus of claim 16 wherein the enclosure incorporates at least one opening to aid in convection.

20. A rapid prototyping apparatus comprising:
a) a process module comprising a first heat-producing component;
b) electro-optical components, at least one of which is a peripheral heat-producing component comprising an exposure system and a computer for controlling the electro-optical components to form a three dimensional object from a building material located in the process module;
c) a structure enclosing the process module and the electro-optical components; and
d) at least one enclosure means within the structure for moving a portion of generated heat from the at least one of the peripheral heat-producing components located in the structure.

21. The apparatus of claim 20 wherein the heat is moved via one or more of, convection, conduction, and radiation.

22. The apparatus of claim 20 wherein at least one electro-optical component is located outside the enclosed means.

23. The apparatus of claim 20 wherein at least 70% of the heat from the peripheral heat-producing components is moved.

24. The apparatus of claim 20 wherein at least a portion of the heat is moved to an external environment.

25. The apparatus of claim 20 wherein at least a portion of the heat is moved to the process module.

26. A rapid prototyping apparatus comprising:
a) a structure enclosing at least a process module and an electro-optical module;
b) a container for holding a building material;
c) an elevator that moves up and down within the container;
d) a platform attached to the elevator upon which three dimensional objects are built from the building material;
e) a heater fan/motor to maintain the process module at a predetermined temperature during object formation;
f) the process module comprising the container, platform, and the heater fan/motor;
g) a laser head including at least one frequency conversion crystal;
h) an infrared laser diode module for generating pumping radiation for the laser head;
i) a recirculating chiller for cooling at least the infrared laser diode module during object formation;
j) a laser power supply for supplying power to at least the infrared laser diode module during object formation;
k) scanning mirrors to direct the output of the laser head to the building material during object formation;
l) a mirror driver electrical chassis for supplying control signals to the scanning mirrors;
m) a chamber controller electrical chassis for controlling at least the laser power, the elevator and the heater;
n) a machine power supply electrical chassis for supplying power to at least the heater and the mirror driver; and
o) a computer programmed to form a three dimensional object from a building material located in the process module, based on data representative of the object, by controlling the operation of at least the chamber controller, the mirror driver, and the laser power supply,
wherein the electro-optical module comprises the laser power supply, the recirculating chiller, the infrared laser diode module, the computer, the machine power supply electrical chassis, the mirror driver electrical chassis, the chamber controller electrical chassis, and the laser head including at least one frequency conversion crystal,
wherein at least one enclosure contains at least the laser power supply, the recirculating chiller, the infrared laser diode module, the computer, the machine power supply electrical chassis, the mirror driver electrical chassis, and the chamber controller electrical chassis, and
wherein the laser head is outside the enclosure within the electro-optical module, and
the enclosure and the structure are detached.

* * * * *

UNITED STATES PATENT AND TRADEMARK OFFICE
CERTIFICATE OF CORRECTION

PATENT NO. : 6,261,077 B1
DATED : July 17, 2001
INVENTOR(S) : Bishop et al.

It is certified that error appears in the above-identified patent and that said Letters Patent is hereby corrected as shown below:

Column 14,
Line 15, "the position necessary" should read -- the position of the second shelf may also vary as necessary --.

Column 16,
Line 16, "to ward" should read -- toward --.
Line 63, "componenet" should read -- component --.

Signed and Sealed this

Eighth Day of October, 2002

Attest:

JAMES E. ROGAN
Attesting Officer
Director of the United States Patent and Trademark Office